(12) United States Patent
Akahane

(10) Patent No.: US 7,556,362 B2
(45) Date of Patent: Jul. 7, 2009

(54) PRESSURE CONTROL VALVE UNIT AND LIQUID EJECTING APPARATUS

(75) Inventor: Fujio Akahane, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 10/585,749

(22) PCT Filed: Jan. 31, 2005

(86) PCT No.: PCT/JP2005/001354

§ 371 (c)(1),
(2), (4) Date: Jul. 12, 2006

(87) PCT Pub. No.: WO2005/075202

PCT Pub. Date: Aug. 18, 2005

(65) Prior Publication Data

US 2007/0182792 A1    Aug. 9, 2007

(30) Foreign Application Priority Data

Feb. 3, 2004    (JP) .............................. 2004-026722

(51) Int. Cl.
*B41J 2/175* (2006.01)

(52) U.S. Cl. .............................. 347/86; 347/40; 347/85; 347/89; 417/53; 417/270; 417/339

(58) Field of Classification Search ....................... None
See application file for complete search history.

(56) References Cited

U.S. PATENT DOCUMENTS

| | | | |
|---|---|---|---|
| 3,953,154 A * | 4/1976 | Wanner ........................ | 417/270 |
| 4,356,499 A * | 10/1982 | Kodama ........................ | 347/40 |
| 4,403,227 A * | 9/1983 | Bertschy et al. ................ | 347/89 |
| 5,518,331 A * | 5/1996 | Moosmann et al. .......... | 401/230 |
| 5,737,001 A * | 4/1998 | Taylor .......................... | 347/85 |
| 5,777,647 A * | 7/1998 | Pawlowski et al. ............. | 347/86 |
| 5,923,353 A * | 7/1999 | Boyd et al. .................... | 347/85 |
| 6,084,617 A * | 7/2000 | Balazer ........................ | 347/86 |
| 6,685,307 B2 * | 2/2004 | Dowell et al. .................. | 347/85 |
| 2001/0020971 A1 * | 9/2001 | Usui et al. ..................... | 347/86 |
| 2002/0109760 A1 * | 8/2002 | Miyazawa et al. ............. | 347/86 |
| 2003/0068231 A1 * | 4/2003 | Cabuz et al. ................... | 417/53 |
| 2003/0135152 A1 * | 7/2003 | Kollar et al. ................... | 604/35 |

FOREIGN PATENT DOCUMENTS

| | | |
|---|---|---|
| JP | 2001-232808 | 8/2001 |
| WO | 03/041964 | 5/2003 |

* cited by examiner

*Primary Examiner*—Matthew Luu
*Assistant Examiner*—John P Zimmermann
(74) *Attorney, Agent, or Firm*—Sughrue Mion, PLLC

(57) ABSTRACT

This invention is a pressure control valve unit including: a unit substrate; a first valve chamber provided at one side of the unit substrate, forming a part of a first liquid flow-path; a second valve chamber provided at the other side of the unit substrate, forming a part of a second liquid flow-path; a first opening-closing valve provided in the first valve chamber; and a second opening-closing valve provided in the second valve chamber. The first liquid flow-path and the second liquid flow-path are formed independently of each other. A pressure of a liquid flowing in the first liquid flow-path and a pressure of a liquid flowing in the second liquid flow-path can be controlled at respective predetermined pressures independently of each other.

18 Claims, 19 Drawing Sheets

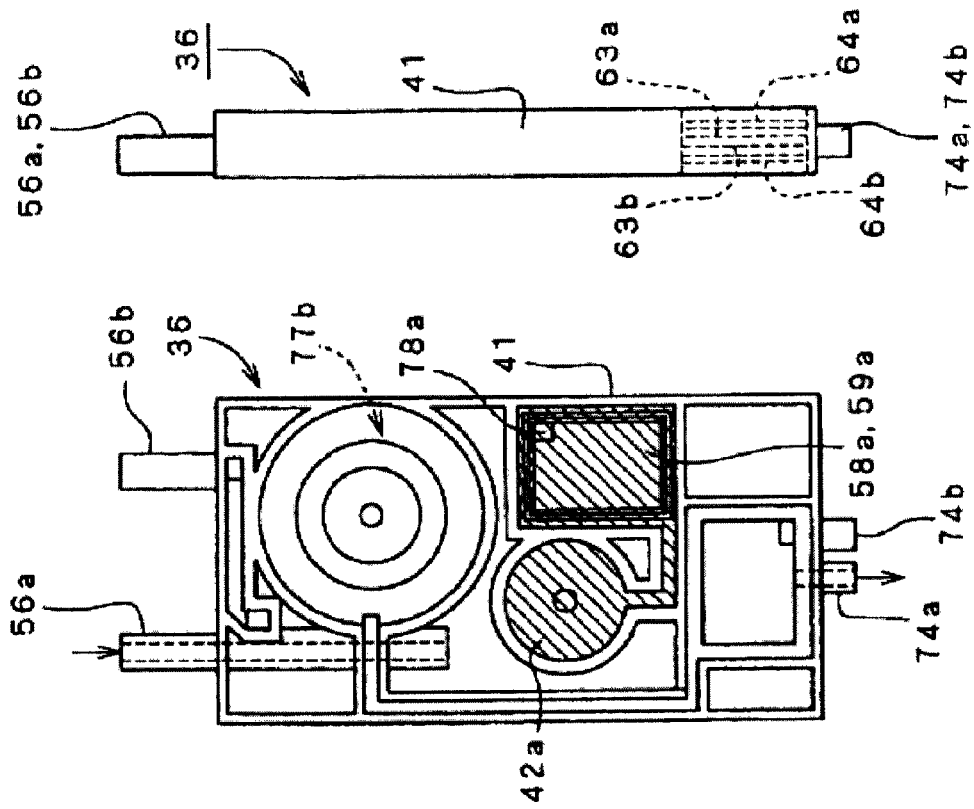
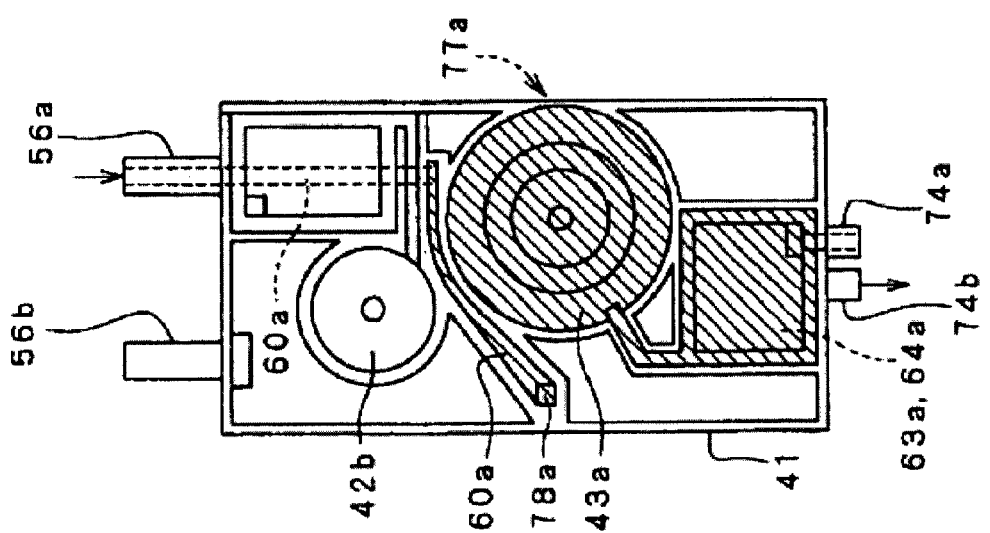

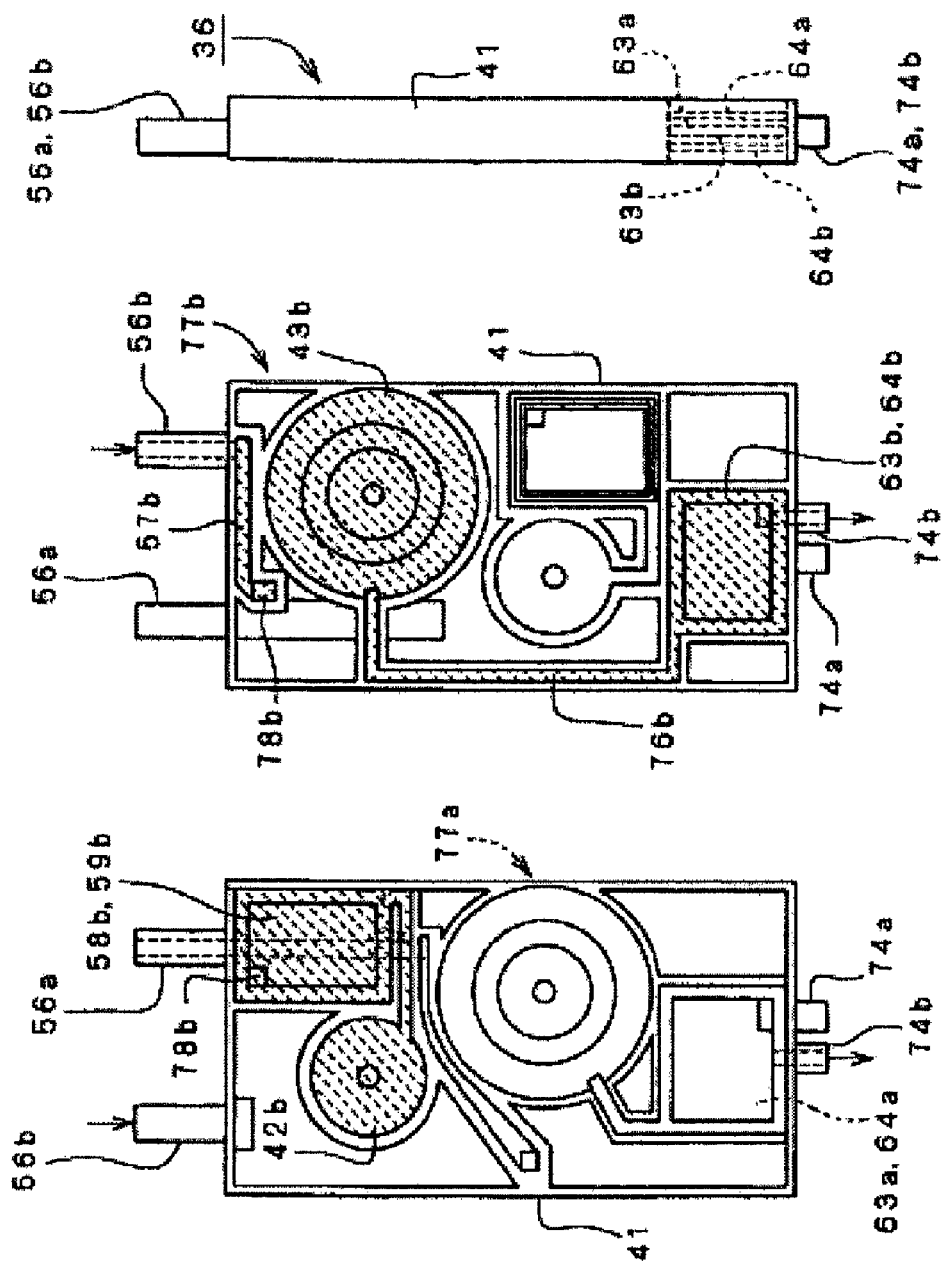

PRESSURE CONTROL VALVE UNIT AND LIQUID EJECTING APPARATUS

FIELD OF THE INVENTION

This invention relates to a pressure control valve unit that supplies liquid from a liquid supplying source into a liquid ejecting head while controlling a pressure of the liquid at a predetermined pressure, and to a liquid ejecting apparatus including the pressure control valve unit.

BACKGROUND ART

A liquid ejecting apparatus that supplies liquid from a liquid supplying source into a liquid ejecting head is used for various kinds of liquid. An ink-jetting recording apparatus is a typical example. Then, the conventional art is explained for an ink-jetting recording as an example.

As shown in FIG. 17A, an ink-jetting recording apparatus 111 comprises: a main-body case 112 as an immobile member, a platen 113, a guide shaft 114, a carriage 115 as a movable member, a timing belt 116, a carriage motor 117, and a recording head 120 as a liquid ejecting head.

In addition, the ink-jetting recording apparatus 111 includes a pressure damper unit 121, an ink-cartridge 123 as a liquid supplying source, a pressure pump 125, and a capping apparatus 126. The pressure damper unit 121 has a function for inhibiting a pressure change of ink in a way from the ink-cartridge 123 to the recording head 120.

The main-body case 112 is a substantially rectangular parallelepiped box-like case. A cartridge holder 112a is formed at a right-hand end portion of the main-body case 112 in FIG. 17A. The platen 113 is arranged in a main-scanning direction, in which the recording head 120 reciprocally moves, in the main-body case 112. The platen 113 has a function for supporting a recording medium (not shown), which is fed by a paper feeding unit (not shown).

The guide shaft 114 is formed by a rod-like member. The guide shaft 114 is arranged in the main-body case 112, in parallel with the platen 113, that is, in the main-scanning direction. The carriage 115 is pierced through by the guide shaft 114 in a relatively movable manner, so that the carriage 115 is supported in a movable manner reciprocally in the main-scanning direction with facing the platen 113.

Then, the carriage 115 is connected to the carriage motor 117 via the timing belt 116. The carriage motor 117 is supported by the main-body case 112. When the carriage motor 117 is driven, the carriage 115 is driven via the timing belt 116. As a result, the carriage 115 moves reciprocally along the guide shaft 114.

The recording head 120 is provided at a surface of the carriage 115, facing the platen 113. The recording head 120 comprises a plurality of nozzles (not shown) for ejecting ink, as a kind of liquid, toward the platen 113.

The pressure damper unit 121 is mounted on the carriage 115. The pressure damper unit 121 stores the ink temporarily, and supplies the ink that has been temporarily stored into the recording head 120 while inhibiting a pressure change of the ink. In the shown example, two pressure damper units 121 are mounted on the carriage 115. However, the number of the pressure damper units 121 may be increased depending on the number of colors of ink or the like.

The ink cartridge 123 is contained in a removable manner in the cartridge holder 112a that is an immobile member. In the shown example, four ink cartridges 123 are arranged correspondingly to four ink colors. In FIG. 17B, a sectional view of one of the four ink cartridges 123 is shown.

As shown in FIG. 17B, the ink cartridge 123 comprises an ink case 131 and an ink pack 132. In the present example, the ink case 131 is formed in a substantially rectangular parallelepiped. In addition, the ink pack 132 is formed by two overlapped films 132a and 132b as flexible members. In the ink pack 132, the ink is sealed. The ink pack 132 has an ink-discharging port 132c. The ink pack 132 is contained in the ink case 131 in such a manner that only the ink-discharging port 132c is exposed from the ink case 131. Other portions of the ink park 132 than the ink-discharging port 132c forms an airtight state in the ink case 131. In addition, a gap 133 is formed between the ink case 131 and the ink pack 132.

In addition, the ink case 131 is provided with a communication hole (not shown) that communicates with the gap 133. When an air is introduced through the communication hole, a pressure in the gap 133 is so increased that a force capable of pressing the ink pack 132 may be generated.

The ink-discharging port 132c of the ink pack 132 is connected to the pressure damper unit 121 via an ink supplying tube 135, for each ink color, as shown in FIG. 17A. The ink supplying tube 135 forms a liquid-supplying way. Thus, when an air is introduced into the gap 133 in the ink case 131, the ink in the ink pack 132 is supplied to the pressure damper unit 121 via the ink supplying tube 135.

The pressure pump 125 is arranged above the ink cartridge 123, and is fixed to the main-body case 112. The pressure pump 125 is capable of absorbing atmospheric air and of discharging pressurized air. The pressurized air discharged from the pressure pump 125 is supplied to a pressure detecting unit 138 via a pressurizing tube 137.

In the pressure detecting unit 138, a pressure of the pressurized air supplied form the pressing pump 125 is detected. Then, based on the pressure detected in the pressure detecting unit 138, an operation of the pressing pump 125 is adjusted. Thus, the air supplied from the pressing pump 125 is adjusted within a predetermined pressure range by the pressure detecting unit 138.

The pressure detecting unit 138 is connected to the communication holes of the respective ink cartridges 123 via four air-supplying tubes 139. Thus, the air adjusted within the predetermined pressure range is introduced into the gap 133 of each ink cartridge 123.

As described above, in each ink cartridge 123, the ink pack 132 is pressed by the pressurized air supplied from the pressing pump 125, and the ink in the ink pack 132 is supplied to the pressure damper unit 121. Then, the ink is temporarily stored in the pressure damper unit 121, and the ink that has been temporarily stored is supplied into the recording head 120 while a pressure change of the ink is inhibited.

At that time, based on image data, an ink drop is ejected from the recording head 120 while the recording medium is fed by the paper-feeding unit (not shown) in a sub-scanning direction and the carriage 115 is moved by the carriage motor 117 in the main scanning direction. Thus, a printing operation onto the recording medium is conducted.

The capping unit 126 is arranged at a non-printing area (at a home position) on the reciprocating way of the carriage 115. Then, a cap 126a formed by an elastic material such as elastomer, which can come in contact with a nozzle-formed surface of the recording head 120 to seal the same, is arranged on an upper surface of the capping unit 126. On the other hand, at the capping unit 126, a straplike wiping member 126f formed by an elastic material such as rubber is provided adjacent to a portion of the cap 126a on a printing-area side.

FIG. 18 is a sectional view showing a state wherein the recording head 120 and the plurality of pressure damper units 121 are integrated via a connection member 140. FIG. 17A shows the example wherein the two pressure damper units 121 are mounted, but FIG. 18 shows an example wherein eight pressure damper units are arranged correspondingly to eight ink colors. Herein, in FIG. 18, in order to depict the numerical signs, the outlines of two pressure damper units 121 are shown by two-dot chain lines.

The pressure damper unit 121 is explained in details. A damper room 121b is formed by hallowing out a side surface of a unit substrate 121a that is a thick plate-like member. Then, on the side surface of the unit substrate 121a, an elastic sheet 121c is attached by thermal welding or the like. Although not shown in FIG. 18, the ink supplying tubes 135 shown in FIG. 17A are connected to the pressure damper units 121 so that the ink flows from the ink supplying tubes 135 into the damper rooms 121b. In addition, in the unit substrate 121a, a flowing-out way 121d is provided. One end thereof is opened to the damper room 121b, and the other end thereof is opened to a lower end portion of the unit substrate 121a. At the lower end portion of the unit substrate 121a, a downward connection tube 121e is formed.

Eight receiving hollow portions 165 are provided at an upper surface of the connection member 140, correspondingly to the eight ink colors. At a bottom part of each receiving hollow portion 165, a film-like or plate-like filter 166 is arranged in a substantially horizontal direction. An ink supplying needle 167 stands up on an upper side of the filter 166. That is, the eight filters 166 are arranged at the upper surface of the connection member 140, and axes of the respective ink supplying needles 167 are substantially perpendicular to the respective filters 166. Then, in order to set a filtration area of the filter 166 at a predetermined size, a lower portion of each ink supplying needle 167 is smoothly enlarged to become a large-diameter portion 167a.

The connection tube 121e of the pressure damper unit 121 is inserted into the receiving hollow portion 165. At that time, an elastic sealing ring 168 is provided between the ink supplying needle 167 and an inside surface of the connection tube 121e, so that the standing posture of the pressure damper unit 121 with respect to the connection member 140 is maintained.

Eight communication ways 170 that extend from the respective filters 166 to respective ink-introducing ports 169 of the recording head 120 are formed in the connection member 140. The lengths of the communication ways 170 are dependent on distances from the respective filters 166 to the respective ink-introducing ports 169, and thus different from each other.

A control board 171 for supplying an operational signal to the recording head 120 is attached on an upper surface of a head case 105. A packing member 172 made of an elastomeric material or the like is layered on the control board 171 for an ink-sealing function. The ink from the communication ways 170 of the connection member 140 is adapted to flow into the ink-introducing ports 169 through holes 172a formed in the packing member 172 and holes 171a formed in the control board 171.

FIG. 19 is a schematically sectional view showing inside structure of the recording head 120 integrated to the connection member 140. With reference to FIG. 19, the inside structure of the recording head 120 is explained.

The recording head (ink-ejecting head) 120 is formed by joining a flow-path unit 103 and the head case 105. Nozzles 101 and pressure generating chambers 102 are formed in the flow-path unit 103. Piezoelectric vibrating members 104 as pressure generating means are contained in the head case 105.

The flow-path unit 103 is formed by laminating a nozzle plate 106, a flow-path forming plate 109, and a vibrating plate 110. The nozzle plate 106 has a nozzle-formed surface 106a in which the nozzles 101 are formed. In the flow-path forming plate 109, a space corresponding to the pressure generating chambers 102, common ink chambers 107 and ink supplying paths 108 communicating the pressure generating chambers 102 with the common ink chambers 107 is formed. The vibrating plate 110 becomes an upper wall of the pressure generating chambers 102. The nozzle-formed surface 106a is flat.

The piezoelectric vibrating member 104 contracts in a longitudinal direction thereof in a charged state, and extends in the longitudinal direction during a discharging process from the charged state, depending on a driving signal inputted thereinto. That is, the piezoelectric vibrating member 104 is so-called a vibrating member of vertical vibration mode. A tip end of the piezoelectric vibrating member 104 is fixed to an island portion 110a of the vibrating plate 110 that forms the upper wall of the pressure generating chambers 102. A base end of the piezoelectric vibrating member 104 is fixed to a base stage 118.

In addition, head flow-paths 119 are formed in the head case 105 at portions corresponding to the common ink chambers 107 in order to introduce the inks from the ink cartridges 123 to the common ink chambers 107. The entrance portion of each head flow path 119 forms the ink-introducing port 169. A circular protrusion 122 is formed at an opening edge of each head flow-path 119.

In the recording head 120, in accordance with contraction/extension of the piezoelectric vibrating member 104, the pressure generating chamber 102 expands/contracts. Thus, a pressure change of the ink is caused in the pressure generating chamber 102, so that suction of an ink meniscus and ejection of an ink drop are carried out. As shown in FIG. 19, a flexible cable 124 for inputting a driving signal in the piezoelectric vibrating member 104 extends from the control board 171 to the piezoelectric vibrating member 104. An end portion of the control board 171 is provided with a connector 173. A control signal from a computer unit, which controls the whole ink-jetting recording apparatus 111, is adapted to be inputted to the connector 173.

In the recording head 120, in a direction perpendicular to the paper of FIG. 19, the piezoelectric vibrating members 104, the pressure generating chambers 102 and the nozzles 101 are arranged in line. That is, in the nozzle plate 106, two rows of nozzles 101a are formed in line. Then, the recording medium (recording paper) is supported by the platen 113 shown in FIG. 17A, and the nozzle-formed surface 106a of the recording head 120 is adapted to face the recording medium with a predetermined gap.

SUMMARY OF THE INVENTION

In the above conventional art, only one kind of ink flows into each pressure damper unit 121. Thus, it is impossible to reduce the number of pressure damper units 121, that is, the pressure damper unit 121 has to be arranged for each kind of ink.

In addition, it is desired to improve structure of the pressure damper unit 121 itself in order to reduce the size of the pressure damper unit 121.

Furthermore, it is also desired to reduce the size of the connecting portion of the pressure damper units 121 and the recording head 120.

In the above example, the plurality of filters 166 arranged at the bottoms of the respective receiving hollow portions 165 of the connection member 140 is arranged in a plane direction of the upper surface of the connection member 140. Then, the filtration area of each filter 166 is much larger than the opening area of the flow-out path 121d in order to achieve a predetermined filter function and/or to reduce resistance of ink flowing. As the filters 166 having such large filtration areas are arranged in the above manner, as shown in FIG. 18, a length in right and left direction (a length in the main scanning direction) of the connection member 140 is much larger than a length in right and left direction of the recording head 120. Thus, it is difficult to make compact the integrated unit of the recording head 120, the connection portion 140 and the pressure damper units 121. That is, it was impossible to reduce the size of the whole apparatus.

In addition, in the above example, the communication paths 170 arranged in the connection member 140 are formed in diagonal directions. In details, a communication path 170 extending from a filter 166 arranged at an end portion of the connection member 140 to an ink-introducing port 169 of the recording head 120 has a large inclination angle and the largest length. On the other hand, a communication path 170 extending from a filter 166 arranged at the central portion of the connection member 140 to an ink-introducing port 169 of the recording head 120 has very little inclination angle and the shortest length. The difference of the paths means dispersion in path resistance of the paths from the respective filters 166 to the recording head 120. This may make not even the ink pressure in the respective pressure generating chambers 102 of the recording head 120, which may cause some trouble in ejecting an ink drop stably.

In addition, the ink supplying needle 167 has a tubular needle portion that is smoothly connected to the large-diameter portion 167a. The inner diameter of the tubular needle portion is set relatively large. Then, the ink flowing may be smoothly diffused, so that the ink may be supplied onto the whole surface of the filter 166 as uniformly as possible. Alternatively, supporting rigidity of the pressure damper unit 121 integrated to the ink supplying needle 167 may be enhanced. Because of such reasons, the inner diameter of the connecting tube 121e that receives the ink supplying needle 167 also has to be set large in designing. When the inner diameter of the connecting tube 121e is large, it is difficult to reduce the size of the pressure damper unit 121 in a thickness direction thereof. In that point of view, it is difficult to make the unit compact.

In addition, when the recording head 120 is reciprocally moved in the main scanning direction, it is important to reduce mass of components to be driven as much as possible, and thus to make it possible to reach a predetermined moving speed within as a short moving range as possible, in views of size reduction of the whole apparatus and electric power consumption and the like. As described above, when the integrated unit including the recording head 120, the connection member 140 and the pressure damper units 121 is large, the mass is also remarkably large. This is very unsuitable for the size reduction and the electric-power-consumption reduction and the like. This problem is more important in a higher reciprocating speed adopted for shortening the printing time.

The object of this invention is to provide a liquid ejecting apparatus that can achieve size reduction of the whole apparatus and stabilization of a liquid ejecting state much more.

The liquid ejecting apparatus of the present invention can achieve the above object, by including a pressure control valve unit having the following features.

A pressure control valve unit of the present invention comprises: a unit substrate; a first valve chamber provided at one side of the unit substrate, forming a part of a first liquid flow-path; a second valve chamber provided at the other side of the unit substrate, forming a part of a second liquid flow-path; a first opening-closing valve provided in the first valve chamber; and a second opening-closing valve provided in the second valve chamber; wherein the first liquid flow-path and the second liquid flow-path are formed independently of each other; and a pressure of a liquid flowing in the first liquid flow-path and a pressure of a liquid flowing in the second liquid flow-path can be controlled at respective predetermined pressures independently of each other.

According to the present invention, one pressure control valve unit can control pressures of two or more kinds of liquid at respective predetermined pressures, independently of each other. Thus, the number of pressure control valve unit to be installed can be reduced. Thus, an integrated unit of the pressure control valve units and a liquid ejecting head can be made more compact. Thus, a liquid ejecting apparatus can be made more compact.

In addition, since the two valve chambers are provided at opposite sides of the unit substrate, a material forming the unit substrate can be effectively used to arrange the two liquid flow-paths, so that the pressure control valve unit itself can be made more compact. In particular, the thickness of the pressure control valve unit can be made smaller. When the thickness of the pressure control valve unit is thin, the pressure control valve unit can be directly joined to a liquid ejecting head. Thus, it becomes unnecessary to provide any connection member like the conventional art. In addition, the length of each flow-path from an outlet part of the pressure control valve unit to an introducing part of the liquid ejecting head may be shortened. Furthermore, the lengths of the respective flow-paths may be made substantially even. Thus, flow-path resistance and the like of the respective flow-paths may be made substantially even, so that liquid-ejecting pressures may be also made substantially even. Thus, stabilization of ejecting performance can be achieved.

Preferably, the first valve chamber is defined by a surface of the one side of the unit substrate and a sheet member, and the second valve chamber is defined by a surface of the other side of the unit substrate and a sheet member.

In addition, preferably, the unit substrate is formed into a flat and substantially rectangular parallelepiped shape. In the case, a space required for each pressure control valve unit may be smaller, so that an integrated unit of the pressure control valve units and a liquid ejecting head may be made more compact.

In addition, preferably, the first valve chamber and the second valve chamber are arranged in a positional relationship wherein they are diagonally shifted as seen in a thickness direction of the unit substrate. In the case, dimension in a vertical direction and/or in a horizontal direction of the unit substrate may be made smaller, so that the size of the pressure control valve unit may be reduced more.

In addition, it is preferable that: a first downstream-side filter-containing chamber in which a first downstream-side filter is contained is provided in the first liquid flow-path on a downstream side of the first valve chamber; a second downstream-side filter-containing chamber in which a second downstream-side filter is contained is provided in the second liquid flow-path on a downstream side of the second valve chamber; and the first downstream-side filter and the second downstream-side filter are located in a vicinity of a lower end of the unit substrate. In the case, lengths of flow-paths between the downstream-side filters whose pressure loss is high and an ejecting part of a liquid ejecting head may be made constant for the respective flow-paths including the respective opening-closing valves. Thus, ejecting property may be made uniform among the respective flow-paths.

In addition, preferably, the pressure control valve unit further comprises: a first pressure chamber provided at the other side of the unit substrate, forming a part of the first liquid flow-path on a downstream side with respect to the first valve chamber; and a second pressure chamber provided at the one side of the unit substrate, forming a part of the second liquid flow-path on a downstream side with respect to the second valve chamber; wherein the first pressure chamber communicates with the first valve chamber via the first opening-closing valve, and is adapted to control a pressure of liquid introduced from the first valve chamber via the first opening-closing valve at a predetermined pressure; and the second pressure chamber communicates with the second valve chamber via the second opening-closing valve, and is adapted to control a pressure of liquid introduced from the second valve chamber via the second opening-closing valve at a predetermined pressure.

In the case, the opening-closing valve provided in each valve chamber can be opened and closed by a driving operation from the pressure-chamber side that is opposite to the valve-chamber side. The driving operation from the pressure-chamber side can have a correct effect on the opening-closing valve in order to control a liquid pressure in the pressure chamber at a predetermined pressure. That is, an operation as a pressure control valve can be surely conducted. In addition, since the valve chamber and the pressure chamber are arranged at opposite sides of the unit substrate, the pressure control valve may be made more compact.

Preferably, the first pressure chamber is defined by a surface of the other side of the unit substrate and a sheet member, and the second pressure chamber is defined by a surface of the one side of the unit substrate and a sheet member.

In addition, it is preferable that a central portion of the first valve chamber and a central portion of the first pressure chamber are arranged in a positional relationship wherein they are overlapped as seen in a thickness direction of the unit substrate, and that a central portion of the second valve chamber and a central portion of the second pressure chamber are arranged in a positional relationship wherein they are overlapped as seen in the thickness direction of the unit substrate.

In the case, the valve chambers and the pressure chambers can be arranged in the unit substrate cohesively. That is, the valve chambers and the pressure chambers can be arranged compactly. In addition, in the case, a driving force from the pressure-chamber side can be easily transmitted to the opening-closing valve of the valve chamber.

In addition, it is preferable that: the central portion of the first valve chamber and the central portion of the first pressure chamber communicate via a first communication hole; a first valve body is inserted through the first communication hole; the first valve body is adapted to function as the first opening-closing valve; the central portion of the second valve chamber and the central portion of the second pressure chamber communicate via a second communication hole; a second valve body is inserted through the second communication hole; and the second valve body is adapted to function as the second opening-closing valve.

In the case, the communication hole, the valve body, the valve chamber, the pressure chamber, and the like are concentrically arranged. Thus, an operation for opening and closing the valve body can be conducted more stably.

In addition, it is preferable that the first valve body is supported by a leaf spring provided in the first valve chamber and that the second valve body is supported by a leaf spring provided in the second valve chamber. When each valve body is supported by a leaf spring in each valve chamber, the thickness of the valve chamber can be made thinner. Conventionally, a valve body has been supported by a coil spring in a valve chamber.

In addition, it is preferable that the first pressure chamber and the second pressure chamber are arranged in a positional relationship wherein they are partially overlapped as seen in a thickness direction of the unit substrate. When this arrangement is adopted, the pressure control valve unit may be made much more compact.

In addition, it is preferable that: a first upstream-side filter-containing chamber in which a first upstream-side filter is contained is provided in the first liquid flow-path on a upstream side of the first valve chamber; a second upstream-side filter-containing chamber in which a second upstream-side filter is contained is provided in the second liquid flow-path on a upstream side of the second valve chamber; and the first upstream-side filter and the second upstream-side filter are located in a vicinity of a upper end of the unit substrate. In the case, impurities in the liquid can be removed, and thus the valve function of the opening-closing valve can be maintained normal. In addition, it can be prevented that impurities flow down to a liquid ejecting head.

It is preferable that an inlet part of the first liquid flow-path and an inlet part of the second liquid flow-path are provided at an upper end of the unit substrate, and that an outlet part of the first liquid flow-path and an outlet part of the second liquid flow-path are provided at a lower end of the unit substrate. In the case, it is easy to connect the inlet parts of the respective liquid flow-paths with liquid supplying tubes or the like extending from a liquid supplying source, and to connect the outlet parts of the respective liquid flow-paths with liquid introducing ports or the like of a liquid ejecting head.

In particular, when each of a front surface, a back surface, a left side surface and a right side surface of the unit substrate is wholly flat, it is extremely easy to arrange the pressure control valve units in such a state that the pressure control valve units stand up on a liquid ejecting head.

A liquid ejecting apparatus that can achieve the object of the present invention is a liquid ejecting apparatus comprising: a pressure control valve unit having any of the above features; a liquid supplying source that introduces liquid into the pressure control valve unit; and a liquid ejecting head that ejects the liquid controlled at a predetermined pressure by the pressure control valve unit.

A liquid cartridge comprising the above pressure control valve unit and a liquid containing part that introduces liquid into the pressure control valve unit should be protected by this application as well.

In addition, a liquid cartridge with an external tank comprising the above pressure control valve unit and an external tank that introduces liquid into the pressure control valve unit should be protected by this application as well.

In addition, the following invention that has been created during study of embodiments should be protected by this application as well. That is, this application intends to protect a pressure control valve unit comprising: a unit substrate; a valve chamber provided at one side of the unit substrate, forming a part of a liquid flow-path; a opening-closing valve provided in the valve chamber; and a pressure chamber provided at the other side of the unit substrate, forming a part of the liquid flow-path on a downstream side with respect to the valve chamber; wherein the pressure chamber communicates with the valve chamber via the opening-closing valve, and is adapted to control a pressure of liquid introduced from the valve chamber via the opening-closing valve at a predetermined pressure; a central portion of the valve chamber and a central portion of the pressure chamber are arranged in a positional relationship wherein they are overlapped as seen in a thickness direction of the unit substrate; the central portion of the valve chamber and the central portion of the pressure chamber communicate via a communication hole; a valve body is inserted through the communication hole; the valve body is adapted to function as the opening-closing valve; and the valve body is supported by a leaf spring provided in the valve chamber. When the valve body is supported by a leaf spring in the valve chamber, the thickness of the valve chamber can be made thinner. Conventionally, a valve body has been supported by a coil spring in a valve chamber.

BRIEF DESCRIPTION OF THE DRAWINGS

FIGS. 4A and 4B are side views showing a front side and a back side of a pressure control valve unit of another embodiment according to the present invention;

FIG. 4C is a front view of the pressure control valve unit of FIGS. 4A and 4B;

FIGS. 5A and 5B are substantially the same drawings as FIGS. 4A and 4B;

FIG. 5C is substantially the same drawing as FIG. 4C;

DESCRIPTION OF THE PREFERRED EMBODIMENT

A liquid ejecting apparatus according to the present invention may be applied to various liquid ejecting operations. Herein, a best mode for carrying out the present invention is explained. FIGS. 1A to 14 show an ink-jetting recording apparatus 11 that is an embodiment of the liquid ejecting apparatus of the present invention.

Figure 1A:
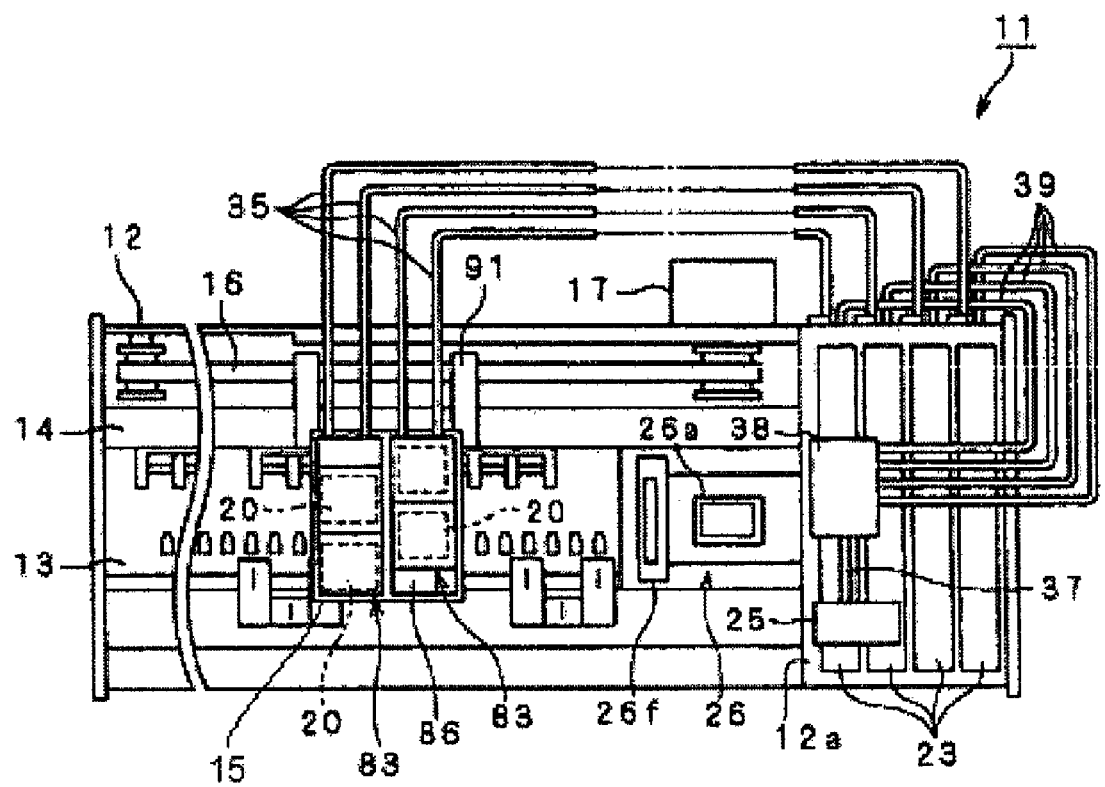
FIG. 1A is a plan view of an ink-jetting apparatus of an embodiment according to the present invention.

As shown in FIG. 1A the ink-jetting recording apparatus 11 comprises: a main-body case 12 as an immobile member, a platen 13, a guide shaft 14, a carriage 15 as a movable member, a timing belt 16, a carriage motor 17, and a recording head 20 as a liquid ejecting head.

In addition, the ink-jetting recording apparatus 11 includes a pressure control valve unit 36, an ink-cartridge 23 as a liquid supplying source, a pressure pump 25, and a capping apparatus 26. The pressure control valve unit 36 has a function for inhibiting a pressure change of ink in a way from the ink-cartridge 23 to the recording head 20.

The main-body case 12 is a substantially rectangular parallelepiped box-like case. A cartridge holder 12a is formed at a right-hand end portion of the main-body case 12 in FIG. 1A. The platen 13 is arranged in a main-scanning direction, in which the recording head 20 reciprocally moves, in the main-body case 12. The platen 13 has a function for supporting a recording medium (not shown), which is fed by a paper feeding unit (not shown).

The guide shaft 14 is formed by a rod-like member. The guide shaft 14 is arranged in the main-body case 12, in parallel with the platen 13, that is, in the main-scanning direction. The carriage 15 is pierced through by the guide shaft 14 in a relatively movable manner, so that the carriage 15 is supported in a movable manner reciprocally in the main-scanning direction with facing the platen 13.

Then, the carriage 15 is connected to the carriage motor 17 via the timing belt 16. The carriage motor 17 is supported by the main-body case 12. When the carriage motor 17 is driven, the carriage 15 is driven via the timing belt 16. As a result, the carriage 15 moves reciprocally along the guide shaft 14.

The recording head 20 is provided at a surface of the carriage 15, facing the platen 13. The recording head 20 comprises a plurality of nozzles (not shown) for ejecting ink, as a kind of liquid, toward the platen 13.

The pressure control valve unit 36 is mounted on the carriage 15. The pressure control valve unit 36 stores the ink temporarily, and supplies the ink that has been temporarily stored into the recording head 20 while inhibiting a pressure change of the ink. In the shown example, as explained below, twenty pressure control valve units 36 are mounted on the carriage 15. However, the number of the pressure control valve units 36 may be increased depending on the number of colors of ink or the like.

Figure 1B:
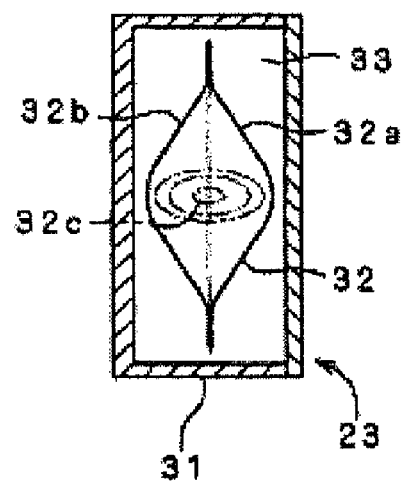
FIG. 1B is a sectional view of the ink cartridge of FIG. 1A.

The ink cartridge 23 is contained in a removable manner in the cartridge holder 12a that is an immobile member. In the shown example, eight ink cartridges 23 are arranged correspondingly to eight ink colors (although only four ink cartridges 23 are shown in the drawing). In FIG. 1B, a sectional view of one of the eight ink cartridges 23 is shown.

As shown in FIG. 1B, the ink cartridge 23 comprises an ink case 31 and an ink pack 32. In the present example, the ink case 31 is formed in a substantially rectangular parallelepiped. In addition, the ink pack 32 is formed by two overlapped films 32a and 32b as flexible members. In the ink pack 32, the ink is sealed. The ink pack 32 has an ink-discharging port 32c. The ink pack 32 is contained in the ink case 31 in such a manner that only the ink-discharging port 32c is exposed from the ink case 31. Other portions of the ink park 32 than the ink-discharging port 32c forms an airtight state in the ink case 31. In addition, a gap 33 is formed between the ink case 31 and the ink pack 32.

In addition, the ink case 31 is provided with a communication hole (not shown) that communicates with the gap 33. When an air is introduced through the communication hole, a pressure in the gap 33 is so increased that a force capable of pressing the ink pack 32 may be generated.

The ink-discharging port 32c of the ink pack 32 is connected to the pressure control valve unit 36 via an ink supplying tube 35, for each ink color, as shown in FIG. 1A. The ink supplying tube 35 forms a liquid-supplying way. Thus, when an air is introduced into the gap 33 in the ink case 31, the ink in the ink pack 32 is supplied to the pressure control valve unit 36 via the ink supplying tube 35.

The pressure pump 25 is arranged above the ink cartridge 23, and is fixed to the main-body case 12. The pressure pump 25 is capable of absorbing atmospheric air and of discharging pressurized air. The pressurized air discharged from the pressure pump 25 is supplied to a pressure detecting unit 38 via a pressurizing tube 37.

In the pressure detecting unit 38, a pressure of the pressurized air supplied form the pressing pump 25 is detected. Then, based on the pressure detected in the pressure detecting unit 38, an operation of the pressing pump 25 is adjusted. Thus, the air supplied from the pressing pump 25 is adjusted within a predetermined pressure range by the pressure detecting unit 38.

The pressure detecting unit 38 is connected to the communication holes of the respective ink cartridges 23 via eight air-supplying tubes 39 (although only four are shown in the drawing). Thus, the air adjusted within the predetermined pressure range is introduced into the gap 33 of each ink cartridge 23.

As described above, in each ink cartridge 23, the ink pack 32 is pressed by the pressurized air supplied from the pressing pump 25, and the ink in the ink pack 32 is supplied to the pressure control valve unit 36. Then, the ink is temporarily stored in the pressure control valve unit 36, and the ink that has been temporarily stored is supplied into the recording head 20 while a pressure change of the ink is inhibited.

At that time, based on image data, an ink drop is ejected from the recording head 20 while the recording medium is fed by the paper-feeding unit (not shown) in a sub-scanning direction and the carriage 15 is moved by the carriage motor 17 in the main scanning direction. Thus, a printing operation onto the recording medium is conducted.

The capping unit 26 is arranged at a non-printing area (at a home position) on the reciprocating way of the carriage 15. Then, a cap 26a formed by an elastic material such as elastomer, which can come in contact with a nozzle-formed surface of the recording head 20 to seal the same, is arranged on an upper surface of the capping unit 26. On the other hand, at the capping unit 26, a straplike wiping member 26f formed by an elastic material such as rubber is provided adjacent to a portion of the cap 26a on a printing-area side.

Figures 2A, 2B, 2C:
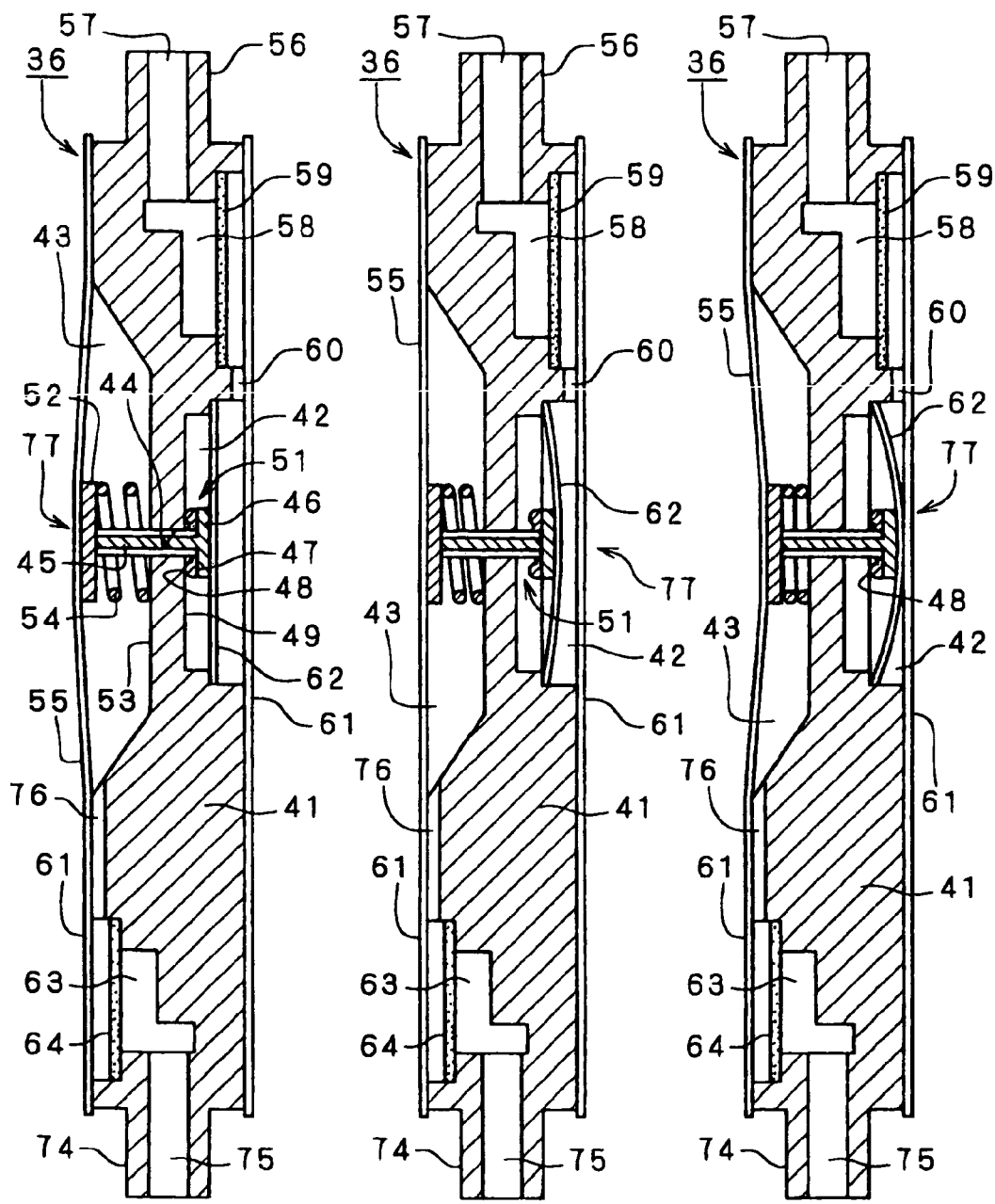
FIGS. 2A to 2C are sectional views for explaining an effect of a pressure control valve unit.
Figure 2D:
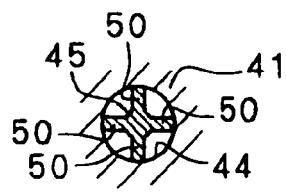
FIG. 2D is a sectional view showing a relationship between a communication hole and a valve body.

Next, with reference to FIGS. 2A to 2C, a basic structure of the pressure control valve unit 36 is explained. The pressure control valve unit 36 of the present invention may be used for a pressure control of the ink, filtration, or composition of the pressure control and the filtration. In addition, it may function as a pressure damper. In the present embodiment, the pressure control valve unit 36 has a composite function of the pressure control and the filtration.

The pressure control valve unit 36 has a unit substrate 41 that is a thick plate member. The outline of the unit substrate 41 is substantially parallelepiped rectangular. A valve chamber 42 is formed by hallowing out a side surface of the unit substrate 41. In addition, a pressure chamber 43 is formed by hallowing out the other side surface of the unit substrate 41. As shown in FIGS. 2A to 4C, the valve chamber 42 and the pressure chamber 43 are in circular shapes as seen in a thickness direction of the unit substrate 41. In addition, the valve chamber 42 and the pressure chamber 43 are arranged concentrically. That is, the valve chamber 42 and the pressure chamber 43 are arranged in a positional relationship wherein they are overlapped as seen in the thickness direction of the unit substrate 41.

The valve chamber 42 and the pressure chamber 43 communicates with each other via a communication hole 44 provided at a central portion thereof. A valve shaft 45 pierces through the communication hole 44. A supporting plate 46 is connected to an end of the valve shaft 45. Then, a circular valve body 47 that is made of an elastic member such as elastomer is fixed to the supporting plate 46. The valve body 47 is provided with a protruded circular seat portion 48. The seat portion 48 is adapted to be seated on a seat surface 49, i.e. a valve seat, formed at a bottom surface of the valve chamber 42. The diameter of the seal portion 48 is set larger than that of the communication hole 44. Thus, when the valve body 47 is seated on the seat surface 49 or moved away from the same, the communication hole 44 is closed or opened. On the other hand, the diameter of the valve shaft 45 is set smaller than that of the communication hole 44. Thus, by means of the diameter difference, an ink flowing path is (strip) 50 in an valve shaft 45 is provided with a guide protruded line (strip) 50 in an axial direction thereof. An outside surface of the guide protruded line 50 is adapted to slide on an inner surface of the communication hole 44.

As described above, the valve body 47 and the seat surface 49 form a opening-closing valve 51. The opening-closing valve 51 is contained in the valve chamber 42.

On the other hand, a disk-like receiving plate 52 is fixed to an end part of the valve shaft 45 that is located in the pressure chamber 43. A compression coil (helical) spring 54 is inserted between the receiving plate 52 and the bottom surface 53 of the pressure chamber 43. The spring force of the compression coil spring 54 acts in a direction in which the valve body 47 is seated on the seat surface 49.

In addition, in the present embodiment, a leaf spring 62 is arranged in the valve chamber 42. The leaf spring 62 has a structure through which the ink can flow. Specifically, for example, a helical slit or S-like slit may be provided or formed in a circle spring plate (see FIGS. 6 and 7). A spring force of the leaf spring 62 is applied to the opening-closing valve 51 in the same direction as the compression coil spring 54.

Onto the surface of the unit substrate 41 in which the pressure chamber 43 is opened, a sheet material 61 is joined by thermal welding or adhesive agents. The sheet material 61 is made of a flexible elastic material having a high gas-barrier performance, for example a synthetic resin film such as a polyphenylene sulfide film or a polyimide film. A circular portion of the sheet member 61 covering the open area of the pressure chamber 43 is an elastic partition 55 which forms a part of a pressure control valve 77, which is described below. A pressing force against the elastic partition 55 obtained by the atmospheric pressure can open and close the opening-closing valve 51, as described below.

A flowing-in tube 56 for receiving the ink supplied from the ink-supplying tube 35 is provided at an upper portion of the unit substrate 41. An inlet port 57 is provided at the flowing-in tube 56. A filter-containing chamber 58 is formed by hollowing out the surface of the unit substrate 41 on the same side as the valve chamber 42. The inlet port 57 communicates with the filter-containing chamber 58. A sheet-like filter 59 is arranged in the filter-containing chamber 58. The filter 59 is arranged in a state (posture) along a flat side surface of the unit substrate 41. A portion of the filter-containing chamber 58 on a downstream side of the filter 59 communicates with the valve chamber 42 through a communication groove 60. In accordance with the above structure, the filter 59 is arranged on an upstream side of the valve chamber 42.

The same sheet member 61 is joined by thermal welding or adhesive agents onto the surface of the unit substrate 41 in which the valve chamber 42 is opened. That is, the sheet material 61 located at the side of the valve chamber 42 consists of the same material as the sheet material 61 located at the side of the pressure chamber 43, that is, for example a synthetic resin film such as a polyphenylene sulfide film or a polyimide film.

On the other hand, a filter-containing chamber 63 for containing a filter for filtering the ink supplied from the pressure chamber 43 is provided at a lower portion of the unit substrate 41. A filter 64 is arranged in the filter-containing chamber 63. The filter-containing chamber 63 is formed by hollowing out the surface of the unit substrate 41 on the same side as the pressure chamber 43. The filter 64 is sheet-like, and arranged in a state (posture) along the flat side surface of the unit substrate 41, in the same manner as the filter 59. A flowing-out tube 74 is provided at a lower portion of the unit substrate 41. An outlet port 75 is provided at the flowing-out tube 74. A portion of the filter-containing chamber 63 on a downstream side of the filter 64 communicates with the outlet port 75. In addition, the pressure chamber 43 and the filter-containing chamber 63 (on the upstream side of the filter 64) communicates with each other through a communication groove 76 formed at a side surface of the unit substrate 41. In accordance with the above structure, the filter 64 is arranged on a downstream side of the pressure chamber 43.

In the above explanation, the filter 59 arranged on the upstream side of the valve chamber 42 is an upstream-side filter, and the filter 64 arranged on the downstream side of the pressure chamber 43 is a downstream-side filter.

In the above explanation, the pressure control valve 77, which forms a part of the pressure control valve unit 36, includes: the valve chamber 42 formed at the one side of the unit substrate 41 for receiving the ink from the ink cartridge 23; the pressure chamber 43 formed at the other side of the unit substrate 41 for controlling a pressure of the ink that have passed through the opening-closing valve 51 in the valve chamber 42 at a predetermined pressure; and the elastic partition 55 for receiving the atmospheric pressure in order to open and close the opening-closing valve 51.

The ink passing through the pressure control valve unit 36 passes through the inlet port 57, the filter-containing chamber 58, the valve chamber 42, the opening-closing valve 51, the communication hole 44, the pressure chamber 43, the communication groove 76, the filter-containing chamber 63 and the outlet-port 75.

Herein, preferably, the valve chamber 42, the pressure chamber 43, the communication hole 44, the filter-containing chambers 58 and 63, the flowing-in tube 56, the flowing-out tube 74, and the like are made by an injection molding of a synthetic resin.

Next, an operation of the pressure control valve unit 36 is explained as follows.

The pressure control valve unit 36 of FIG. 2A is in a state wherein the ink is not consumed. In this state, by means of the spring forces of the compression coil spring 54 and the leaf spring 62, the seat portion 48 of the valve body 47 is seated on the seat surface 49 so that the communication hole 44 is closed.

From the above state, when a printing operation is started and an ink drop is ejected from the recording head 20, a pressure of the ink in the pressure chamber 43 is reduced correspondingly to the ink consumption. When the pressure of the ink becomes lower than a predetermined value, since the atmospheric pressure is applied to the elastic partition 55, the compression coil spring 54 is caused to contract, and the leaf spring 62 is deformed rightward in FIG. 2, so that the seat portion 48 is moved away from the seat surface 49. Thus, the communication hole 44 is opened. That is, the opening-closing valve 51 is opened (see FIG. 2B).

When the ink consumption advances and the pressure of the ink in the pressure chamber 43 is reduced more, as shown in FIG. 2C, the opening-closing valve 51 is fully opened. Thus, the ink supplied from the pressure pump 25 flows into the pressure chamber 43 through the valve chamber 42 and the communication hole 44. Therefore, the pressure in the pressure chamber 43 is increased. Then, because of the spring forces of the compression coil spring 54 and the leaf spring 62, the seat portion 48 is seated on the seat surface 49 again, so that the communication hole 44 is closed again.

Spring constants of the compression coil spring 54 and the leaf spring 62, a pressure-receiving area of the elastic partition 55, and the like are adjusted in order for the pressure in the pressure chamber 43 to change only within a small range correspondingly to the ink consumption. Thus, a pressure-change amount of the ink supplied to the recording head 20 is controlled within a small range. Thus, an ejecting state of an ink drop is stabilized.

The filter 59 arranged on the upstream side of the valve chamber 42 filters out impurities in the path from the ink cartridge 23 to the valve chamber 42, so that normal seating performance of the opening-closing valve 51 is maintained. The filter 64 arranged on the downstream side of the pressure chamber 43 filters out impurities such as scraps of the material of the unit substrate 41, which may be generated at a sliding portion of the guide protruded line 50 and the communication hole 44, so that the normal operation of the recording head 20 is maintained.

Figures 3A, 3B:
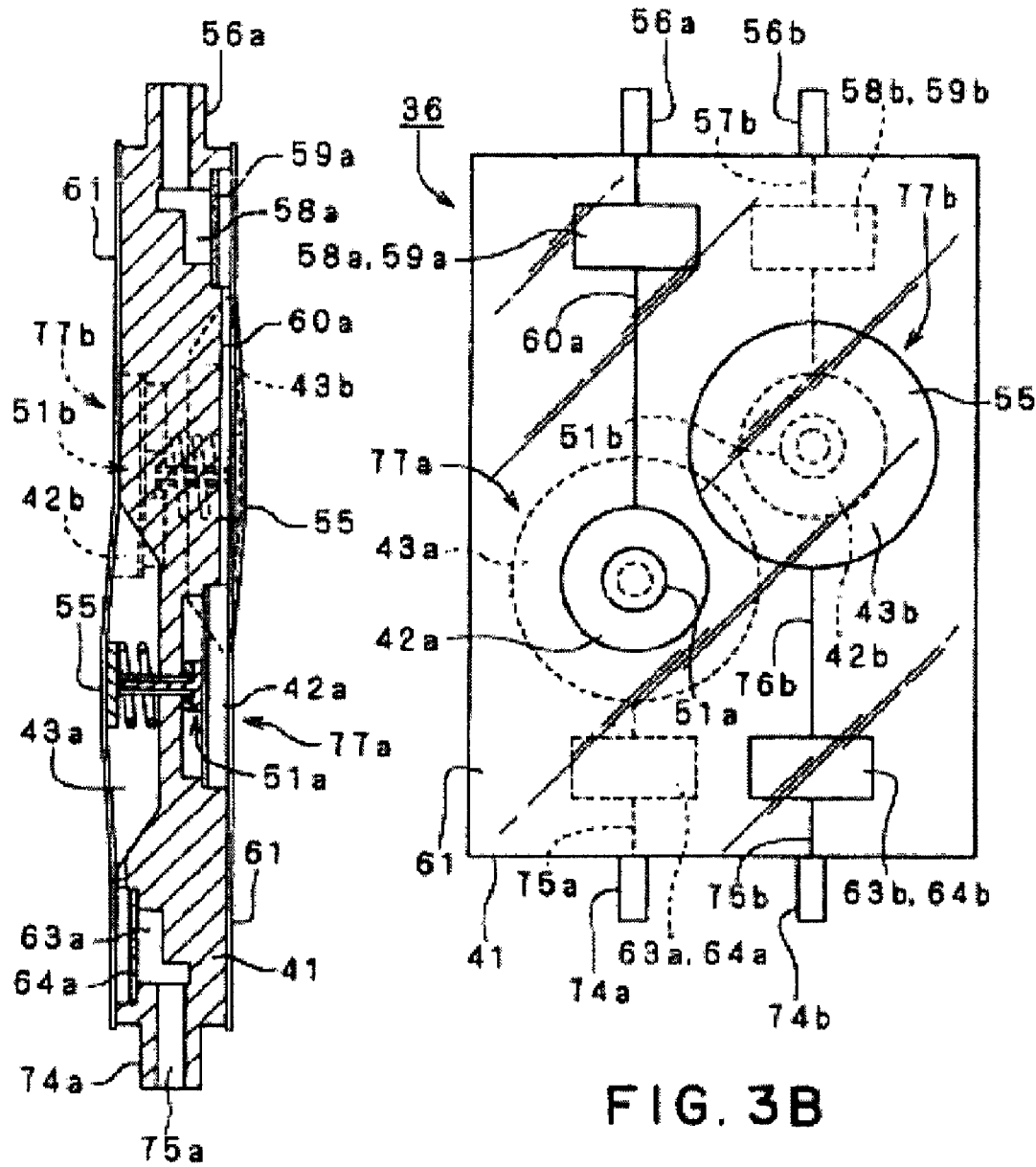
FIG. 3A is a sectional view of a pressure control valve unit of an embodiment according to the present invention.
FIG. 3B is a schematic view of the pressure control valve unit of FIG. 3A.

The explanation based on FIGS. 2A to 2C is given for a single pressure control valve 77. However, one main feature of the present invention is that two pressure control valves 77 are mounted on one unit substrate 41, as shown in FIGS. 3A to 7. In the following explanation, the pressure control valve 77 itself, the upstream-side filter and the downstream-side filter have the same structures as shown in FIGS. 2A to 2C. However, "a" is attached to a numeral sign of each part of one pressure control valve 77, and "b" is attached to a numeral sign of each part of the other pressure control valve 77. Herein, FIG. 3A is a sectional view of the pressure control valve unit of the present embodiment, and FIG. 3B is a schematic view showing the pressure control valves 77a, 77b, arrangement of the filters, and flowing-paths.

As shown in FIGS. 3A and 3B, a valve chamber 42a of a pressure control valve 77a is formed at one side of the unit substrate 41, and a valve chamber 42b of a pressure control valve 77b is formed at the other side of the unit substrate 41. In addition, a pressure chamber 43a is formed at the other side of the unit substrate 41, and a pressure chamber 43b is formed at the one side of the unit substrate 41. As described above, the valve chambers 42a, 42b and the pressure chambers 43a, 43b are formed on opposite surfaces of the unit substrate 41, respectively. Similarly, the filter-containing chambers 58a, 58b, 63a, 63b are provided on the opposite surfaces of the unit substrate 41, respectively.

The pressure control valve 77a is arranged diagonally lower than the pressure control valve 77b. That is, the valve chamber 42a provided at the one side of the unit substrate 41 and the valve chamber 42b provided at the other side are arranged in a positional relationship wherein they are diagonally shifted. The outer circle of the pressure chamber 43a and the outer circle of the pressure chamber 43b are overlapped as seen in the thickness direction of the unit substrate 41, as shown in FIG. 3B. Thus, the two pressure control valves 77a, 77b may be arranged close to each other, so that the pressure control valve unit 36 may be made more compact.

Filters 64a, 64b are arranged on respective downstream sides of the pressure chambers 43a, 43b, as downstream-side filters. The filters (downstream-side filters) 64a, 64b are arranged in a vicinity of a downstream end of the pressure control valve unit 36. That is, as shown in FIG. 3B, at a lower portion of the unit substrate 41, the filter-containing chambers 63a, 63b and the filters 64a, 64b are arranged side-by-side.

In accordance with the above arrangement, the ink introduced from the flowing-in tube 56a flows through a flow-path system including the filter (upstream-side filter) 59a, the valve chamber 42a, the opening-closing valve 51a, the pressure chamber 43a, the filter (downstream-side filter) 64a, and the outlet port 75a. On the other hand, the ink introduced from the flowing-in tube 56b independently flows through a flow-path system including the filter (upstream-side filter) 59b, the valve chamber 42b, the opening-closing valve 51b, the pressure chamber 43b, the filter (downstream-side filter) 64b, and the outlet port 75b. Herein, the present embodiment has the two flow-path systems, but may have three or more flow-path systems.

FIGS. 4A to 4C and 5A to 5C show pressure control valve units 36' of other embodiments of the present invention. In the pressure control valve units 36' as well, the valve chambers 42a, 42b, the pressure chambers 43a, 43b, and the like are arranged at the opposite surfaces of the unit substrate 41, and the flow-path systems of the ink are the same as the embodiment shown in FIGS. 3A and 3B. In the pressure control valve units 36', specific arrangement of the pressure control valves 77a, 77b and the filters 59a, 59b and so on are changed.

FIG. 4A is a side view of the one pressure control valve unit 36' as seen from a front side (one side). FIG. 4B is a side view of the one pressure control valve unit 36' as seen from a back side (the other side). In these side views, respective flow-paths are clearly shown assuming that the sheet members 61 joined on the front and back sides of the unit substrate 41 are transparent or semitransparent. In these drawings, hatched portions are ink-existing portions.

As shown in FIG. 4A, the ink introduced from the flowing-in tube 56a flows through a communication groove 60a shown by a chained line and a communication groove 60a shown with a hatching, through a hole 78a, into the filter-containing chamber 58a (filter 59a) at the back side shown in FIG. 4B, and into a valve chamber 42a at the back side. Then, the ink flows from the valve chamber 42a at the back side, through the opening-closing valve 51 (not shown in FIG. 4), into the pressure chamber 43a at the front side. Then, the ink flows out of the pressure control valve unit 36 through a filter-containing chamber 63a (downstream-side filter 64a) and a flowing-out tube 74a.

Similar to FIG. 4A, FIG. 5A is a side view of the other pressure control valve unit 36' as seen from a front side (one side). Similar to FIG. 4B, FIG. 5B is a side view of the other pressure control valve unit 36' as seen from a back side (the other side). In these side views, respective flow-paths are clearly shown assuming that the sheet members 61 joined on the front and back sides of the unit substrate 41 are transparent or semitransparent. In these drawings, hatched portions are ink-existing portions.

As shown in FIG. 5B, the ink introduced from the flowing-in tube 56b flows from a flow-path (inlet port) 57b at the back side shown with a hatching, through a hole 78b, into the filter-containing chamber 58b (filter 59b) at the front side shown in FIG. 5A, and into a valve chamber 42a at the front side. Then, the ink flows from the valve chamber 42b at the front side, through the opening-closing valve 51 (not shown in FIG. 5), into the pressure chamber 43b at the back side. Then, the ink flows out of the pressure control valve unit 36 through a communication groove 76b, a filter-containing chamber 63b (downstream-side filter 64b) and a flowing-out tube 74b.

The filter-containing chambers 63a, 63b and the filters (downstream-side filters) 64a, 64b are arranged in a vicinity of a downstream end of the pressure control valve unit 36', similar to the embodiment shown in FIG. 3. That is, as shown in FIGS. 4A to 4C and 5A to 5C, at a lower portion of the unit substrate 41, the filter-containing chamber 63a and the filter (downstream-side filter) 64a, and the filter-containing chamber 63b and the filter (downstream-side filter) 64b are arranged side-by-side. The filter-containing chambers 63a, 63b are formed by hollowing out the front side and the back side of the unit substrate 41, respectively. As shown in FIGS. 4A to 4C and 5A to 5C, the filter-containing chambers 63a and the filter (downstream-side filter) 64a, and the filter-containing chambers 63b and the filter (downstream-side filter) 64b are overlapped as seen in the thickness direction of the unit substrate 41.

Thus, since the filter-containing chambers 63a, the filter (downstream-side filter) 64a and the filter-containing chambers 63b, the filter (downstream-side filter) 64b are arranged in the overlapped state as seen in the thickness direction of the unit substrate 41, the flowing-out tubes 74a, 74b that communicate with the filter-containing chambers 63a, 63b may be arranged close to each other. Thus, it becomes easy to connect the pressure control valve unit 36' to an ink-introducing port of the recording head 20.

The pressure control valves 77a, 77b shown in FIGS. 4A to 4C and 5A to 5C are arranged in a positional relationship wherein they are diagonally shifted, similar to that shown in FIG. 3. Thus, the valve chamber 42a provided at the back side of the unit substrate 41 ad the valve chamber 42b provided at the front side are arranged in a positional relationship wherein they are diagonally shifted. The outer circle of the pressure chamber 43a and the outer circle of the pressure chamber 43b are overlapped as seen in the thickness direction of the unit substrate 41, as shown in FIGS. 4A to 4C and 5A to 5C. Thus, the two pressure control valves 77a, 77b may be arranged close to each other, so that the pressure control valve unit 36 may be made more compact.

Figure 6:
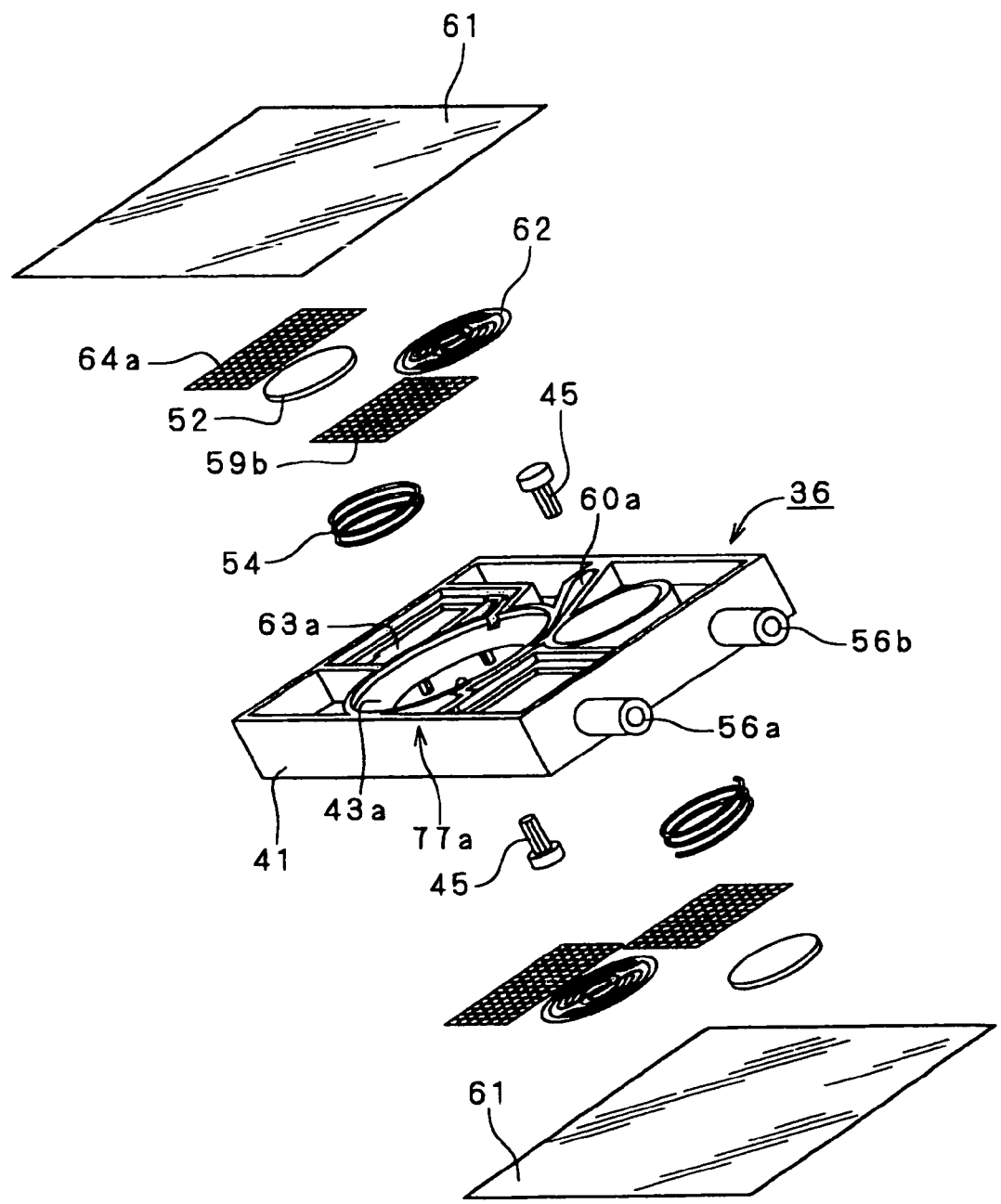
FIG. 6 is an exploded perspective view of the pressure control valve unit shown in FIGS. 4A to 4C.
Figure 7:
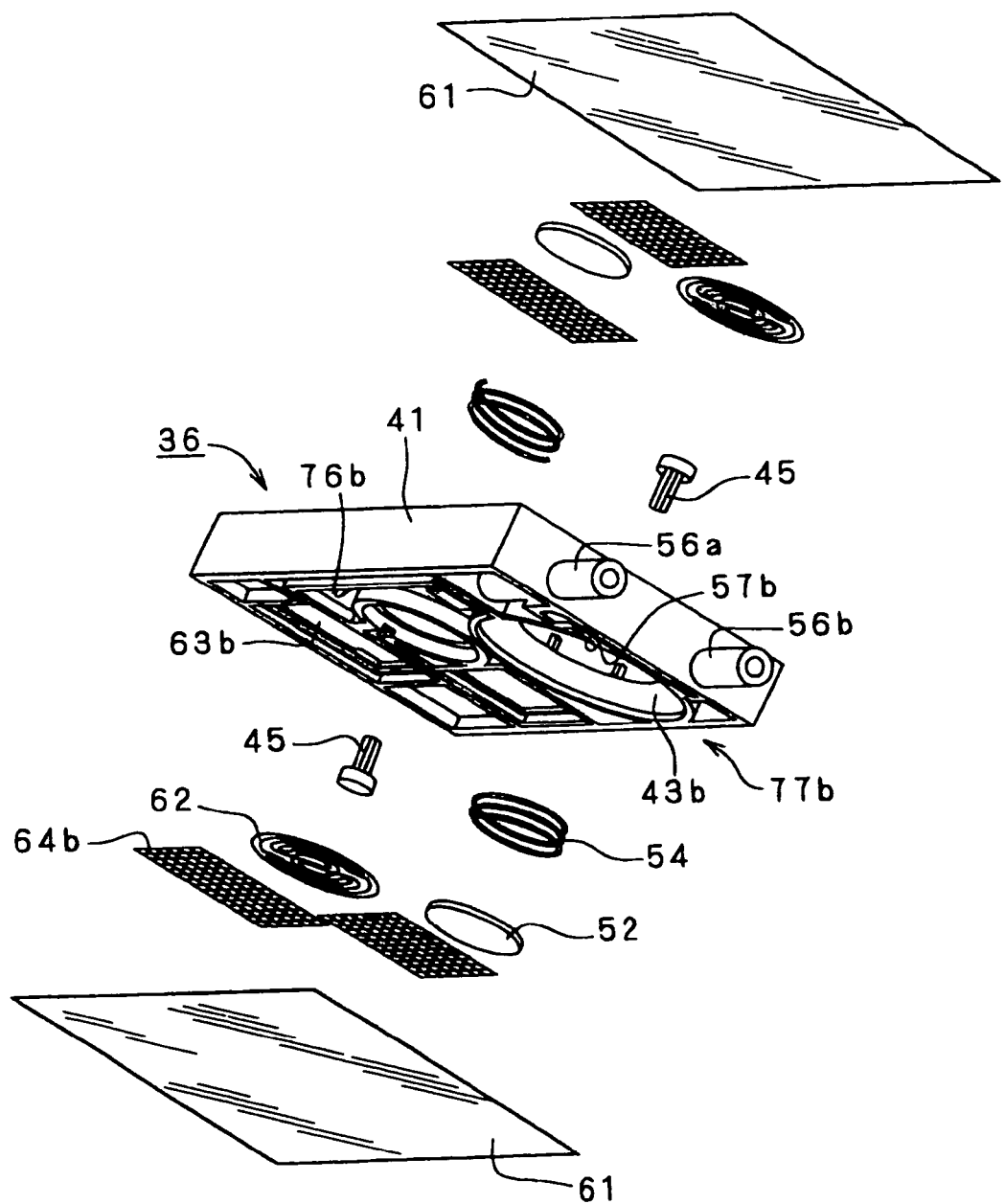
FIG. 7 is an exploded perspective view of the pressure control valve unit shown in FIGS. 4A to 4C.

FIGS. 6 and 7 are stereoscopic exploded views of the pressure control valve units 36' shown in FIGS. 4A to 4C and 5A to 5C.

Figure 8A:
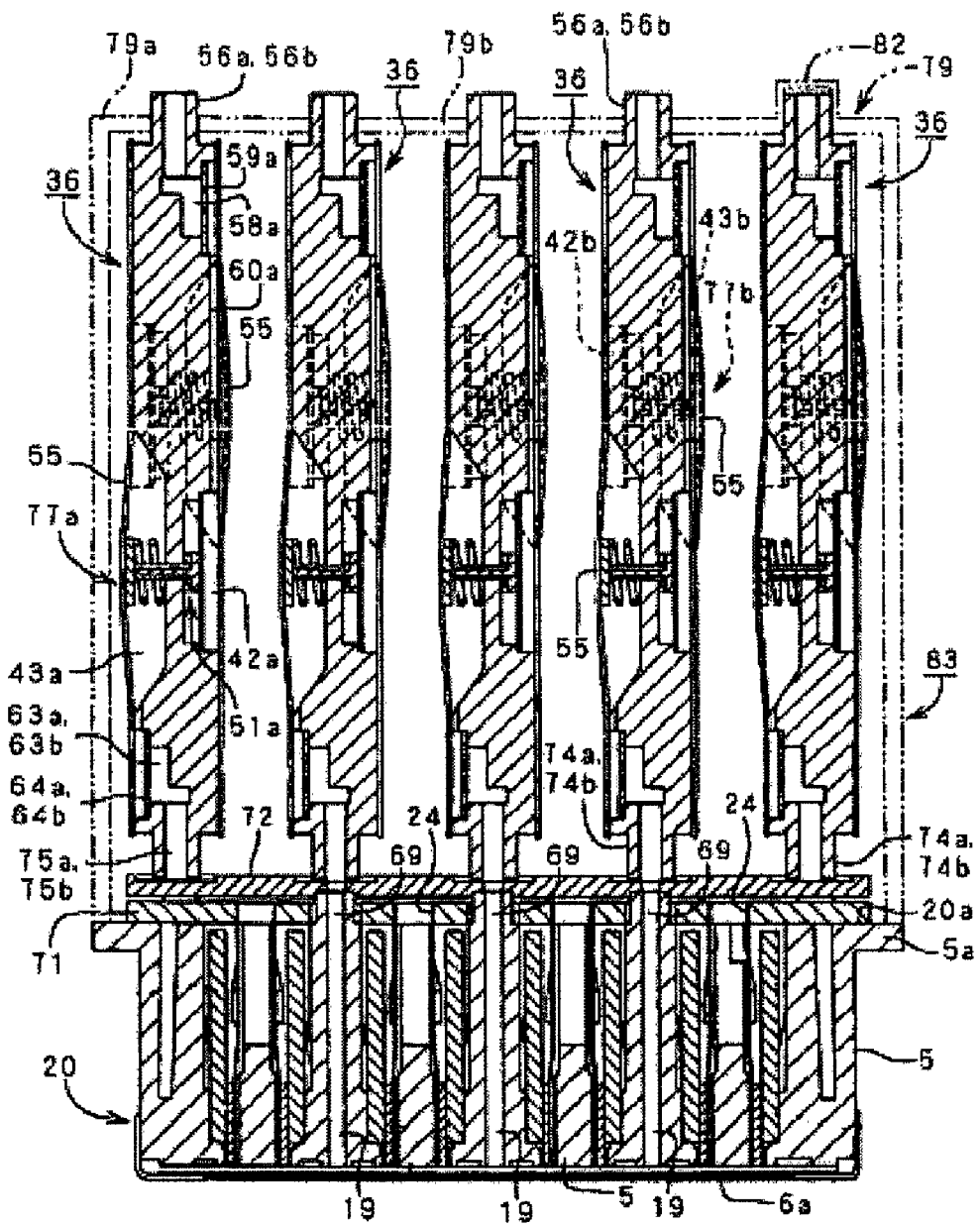
FIG. 8A is a sectional view of an ink ejecting unit in an embodiment according to the present invention.
Figure 8B:
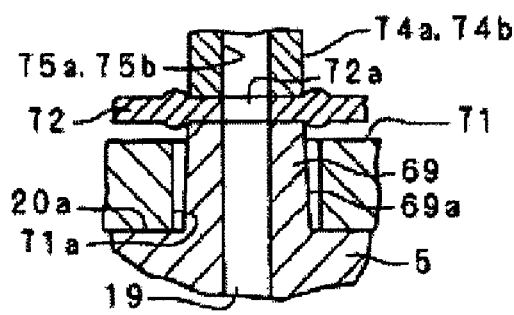
FIG. 8B is an enlarged partial sectional view of a connecting portion of the ink ejecting unit of FIG. 8A.
Figure 9:
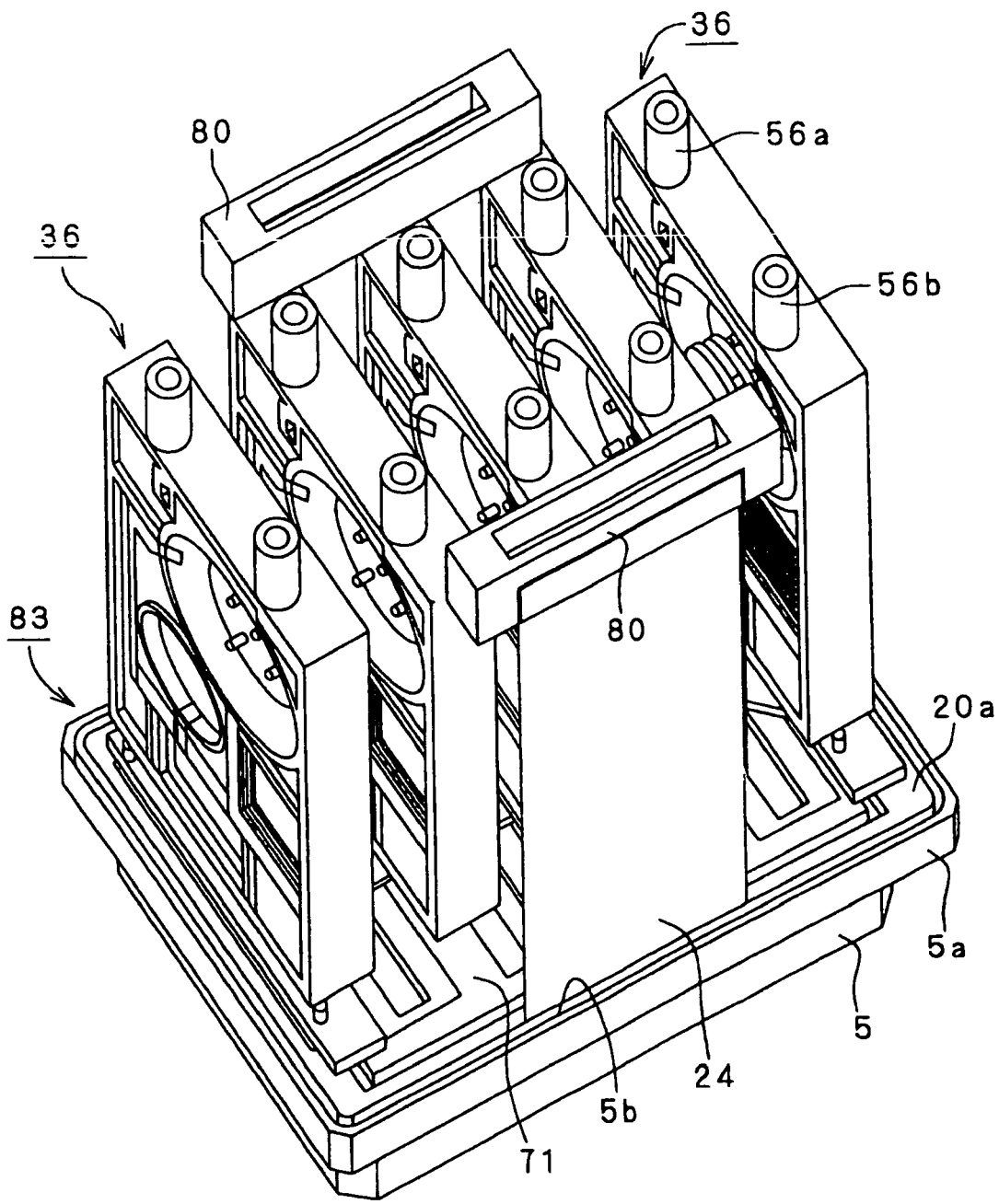
FIG. 9 is a perspective view of the ink ejecting unit of FIG. 8A.
Figure 10:
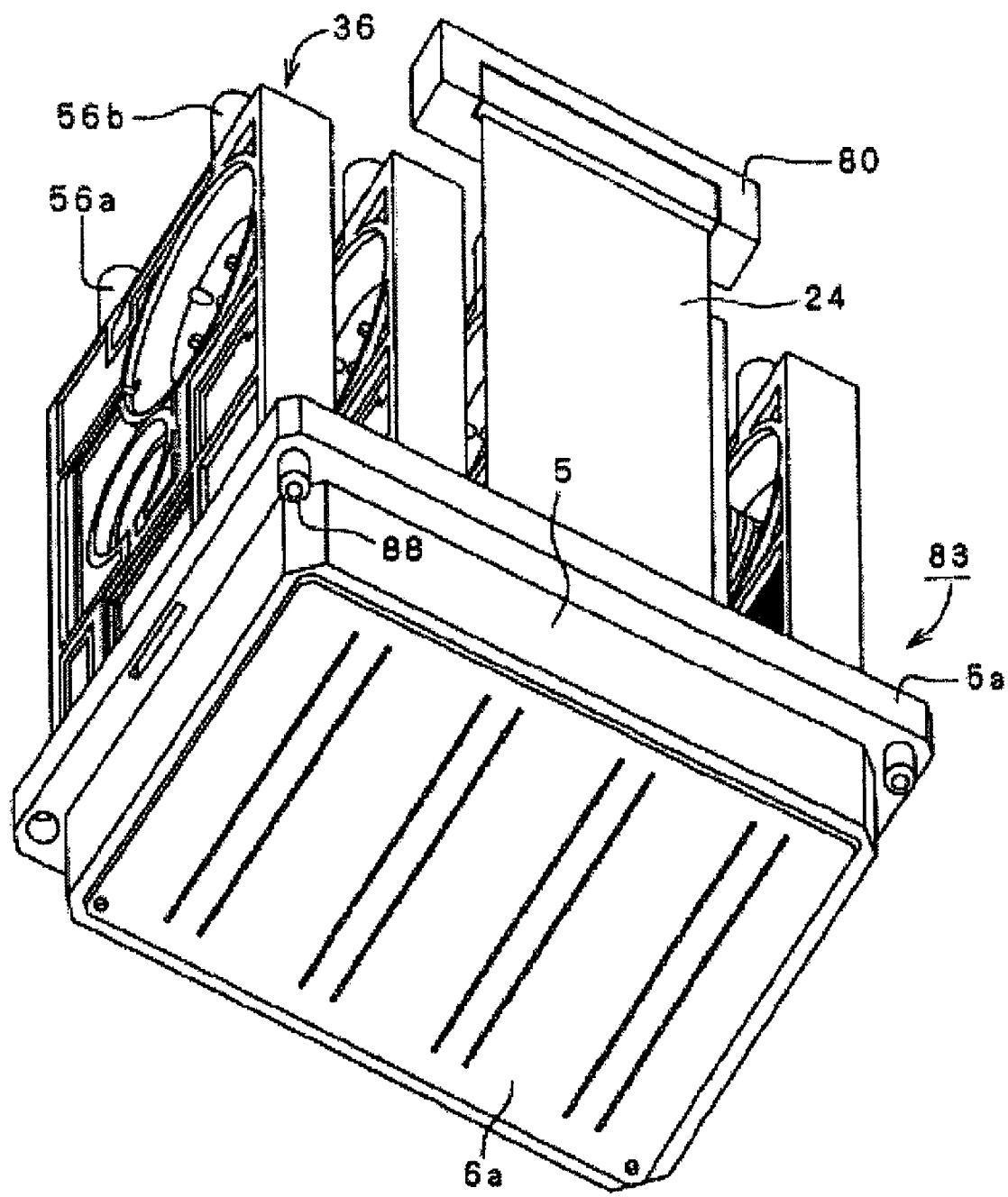
FIG. 10 is a perspective view of the ink ejecting unit of FIG. 8A as seen from a side of a nozzle-formed surface.
Figures 11A, 11B:
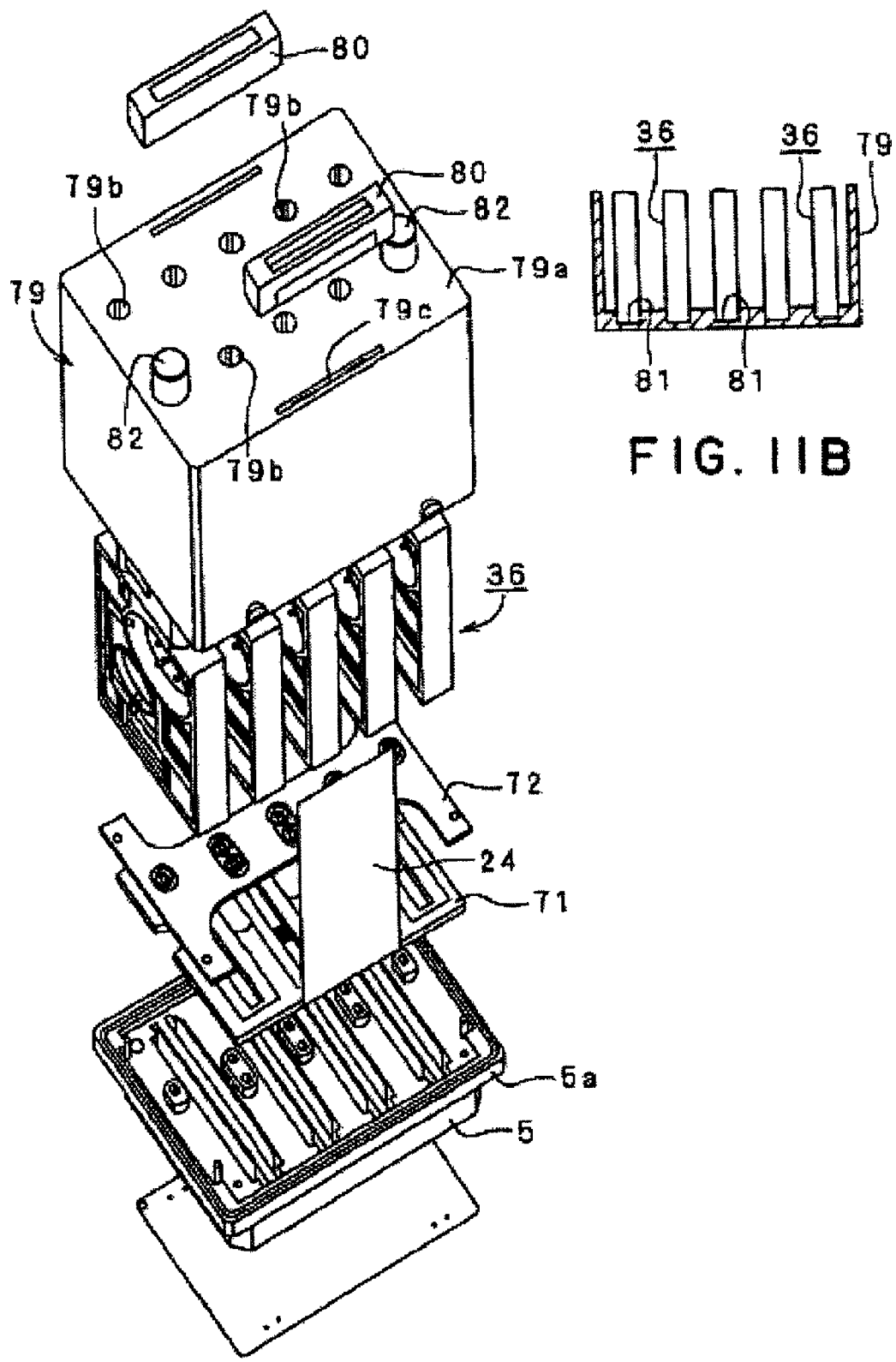
FIG. 11A is an exploded perspective view of the ink ejecting unit of FIG. 8A.
FIG. 11B is a schematic transversal sectional view for explaining a guide means in an inner side wall of a cover box.
Figures 12A, 12B:
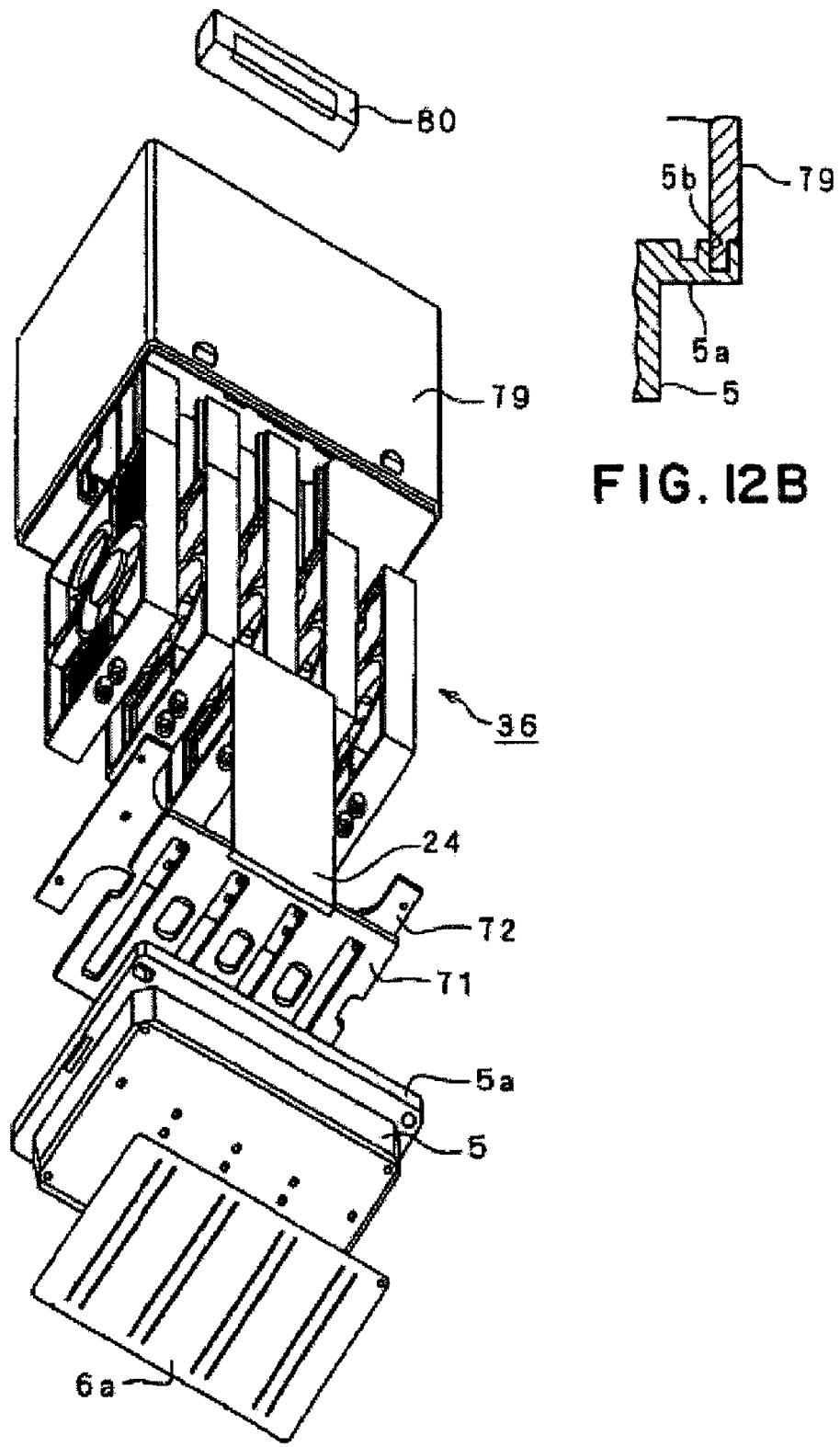
FIG. 12A is an exploded perspective view of the ink ejecting unit of FIG. 8A as seen from a side of the nozzle-formed surface.
FIG. 12B is a schematic sectional view for explaining a connecting state of a flange and the cover box.

Next, with reference to FIGS. 8A to 12B, an ink ejecting unit wherein the above pressure control valve units 36 are directly joined to the recording head 20 is explained. The ink ejecting unit is accompanied with a numeral sign 83. Herein, FIG. 8A is a sectional view of the ink ejecting unit 83, FIG. 8B is an enlarged partial sectional view of a connecting portion of the ink ejecting unit 83 of FIG. 8A, FIG. 9 is a perspective view of the ink ejecting unit 83 of FIG. 8A, FIG. 10 is a perspective view of the ink ejecting unit 83 of FIG. 8A as seen from a side of a nozzle-formed surface 6a, FIG. 11A is an exploded perspective view of the ink ejecting unit 83 of FIG. 8A, FIG. 11B is a schematic transversal sectional view for explaining a guide means 81 in an inner side wall of a cover box 79, FIG. 12A is an exploded perspective view of the ink ejecting unit 83 of FIG. 8A as seen from a side of the nozzle-formed surface 6a, and FIG. 12B is a schematic sectional view for explaining a connecting state of a flange 5a and the cover box 79.

Figure 19:
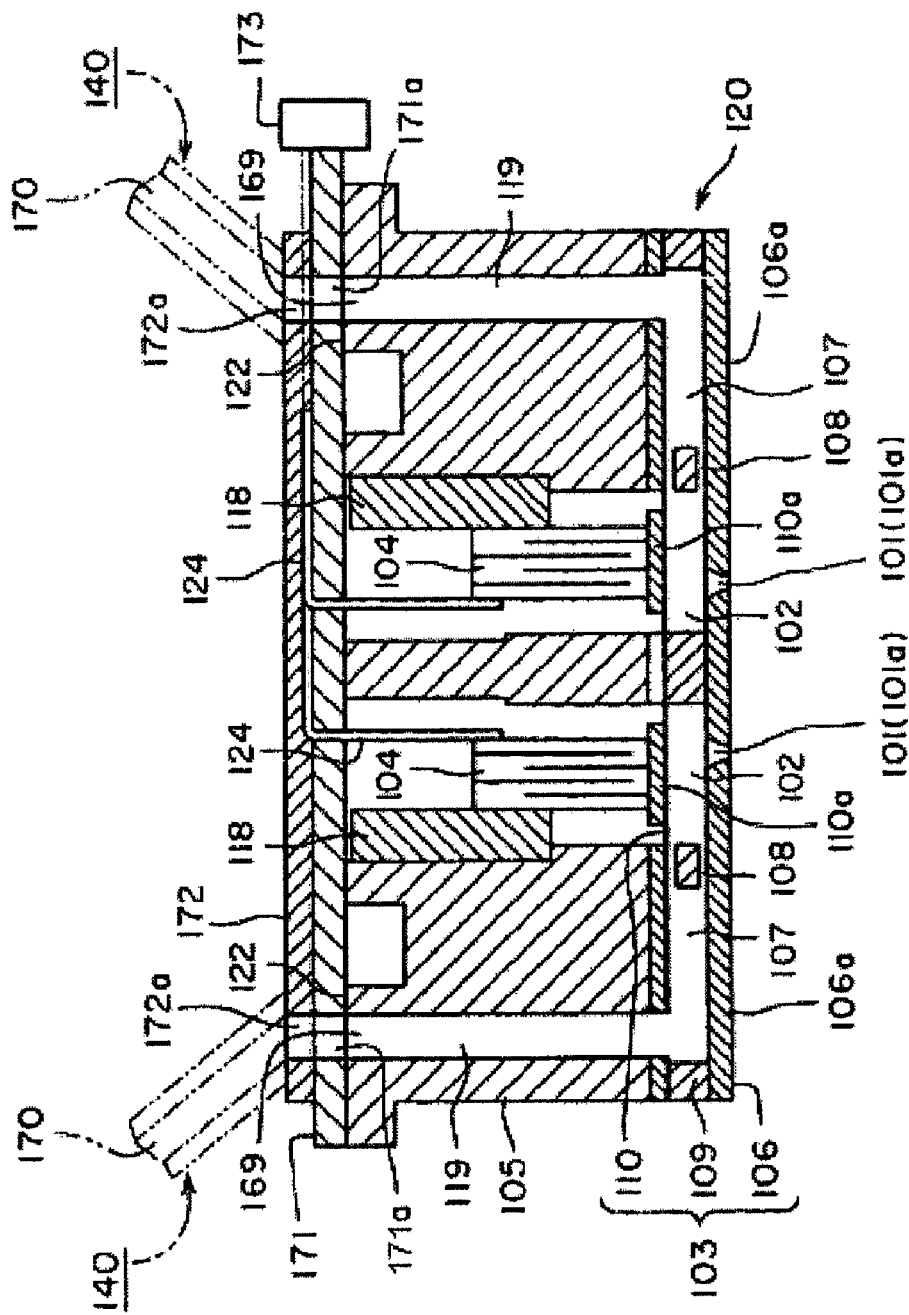
FIG. 19 is a sectional view showing inside structure of the recording head.

Inside structure of the recording head 20 is the same as the inside structure of the conventional recording head 120 shown in FIG. 19. In addition, inside structure of each pressure control valve unit 36 is the same as explained with reference to FIGS. 2A to 2C and 3A to 3B. Parts having the same functions are accompanied with the same numeral signs.

An outline shape of each pressure control valve unit 36 is flat and substantially parallelepiped rectangular. Five pressure control valve units 36 are joined to an upper surface portion 20a of the recording head 20 in a standing-up state. The upper surface portion 20a of the recording head 20 located opposite to nozzle-formed surface 6a of the recording head 20. FIG. 8B shows detailed structure of a connecting portion. As shown in FIG. 8B, the upper surface portion 20a of the head case 5 of the recording head 20 is joined to a control board 71, an introducing tube 69a projecting from the head case 5 slightly protrudes from the control board 71 through a hole 71a of the control board 71. In addition, a packing member 72 for sealing the ink is attached to a connecting portion between the introducing tube 69a and the flowing-out tube 74a, 74b.

As shown in FIG. 8B, in a state wherein the pressure control valve units 36 are directly joined to the recording head 20, the outlet port 75a, 75b of each pressure control valve unit 36, a hole 72a of the packing member 72, and the ink-introducing port 69 of each head flow-path 19 are arranged in a substantially concentric positional relationship. Then, as shown in FIGS. 8A and 9, the pressure control valve units 36 standing up at the upper surface portion 20a of the recording head 20 are joined within an extent (area) of the upper surface portion 20a. That is, within a region defined by vertical and transversal dimensions of the nozzle-formed surface 6a, the pressure control valve units 36 may be arranged in the standing-up state.

As a method for stably joining the pressure control valve units 36 and the recording head 20, a metal fitting is provided between the pressure control valve units 36 and the head case 5. Alternatively, instead of the metal fitting, various types of structure may be adopted. In the example of FIG. 8A, the cover box 79 having a substantially parallelepiped rectangular shape is fixed to the head case 5. Thus, a stable connection is assured. A lower portion of the cover box 79 is opened, but an upper portion thereof is provided with an upper plate 79. The flowing-in tube 56a, 56b projecting from the unit substrate 41 pierces through the upper plate 79a. Holes 79b which the flowing-in tubes 56a, 56b pierce through are shown in FIG. 11A. The flowing-in tube 56a, 56b projecting from the hole 79b is connected to the ink supplying tube 35.

In order to fix the cover box 79 to the head case 5, for example, the head case 5 is strongly fitted into the opened lower portion of the cover box 79. Alternatively, any other connecting method may be adopted. In the example, as shown in FIGS. 9 and 12B, a narrow flange 5a is provided at an upper portion of the head case 5, a frame-like fitting-in groove 5b is formed on an upper surface of the narrow flange 5a, and an opening edge of the cover box 79 is fitted in the fitting-in groove 5b. The width of the flange 5a is set as small as possible, in order to reduce the outermost dimension of the head case 5 as much as possible.

An end of a flexible cable 24 is connected to the control board 71, and the flexible cable 24 extends upward along an inner surface of the cover box 79. The other end of the flexible cable 24 projects outward from a slit hole 79c provided at the upper plate 79a. The projecting flexible cable 24 is adapted to be connected to a wire-connection connector 80.

As shown in FIG. 11B, in a state wherein the pressure control valve units 36 are inserted in the cover box 79, in order to prevent that a relative position of the pressure control valve units 36 and the cover box 79 is easily disturbed, a guide means 81 is provided in an inner side wall of the cover box 79. Specifically, the guide means 81 is a guide groove provided in parallel with the inner side wall of the cover box 79. An end portion of each pressure control valve unit 36 slidably moves in the guide groove 81. Thus, each pressure control valve unit 36 is positioned at a predetermined position in the cover box 79.

In each pressure control valve unit 36, two pressure control valves 77 are integrated. Then, the five pressure control valve units 36 are joined to the recording head 20. Thus, ten kinds of ink are capable of being supplied to the recording head 20. In the present embodiment, eight kinds of ink are used. Thus, caps 82 are attached to the residual two flowing-in tubes 56a or 56b, as shown in FIGS. 8A and 11A. Thus, it is prevented that impurities such as dust come into the pressure control valve units 36.

Figure 13A:
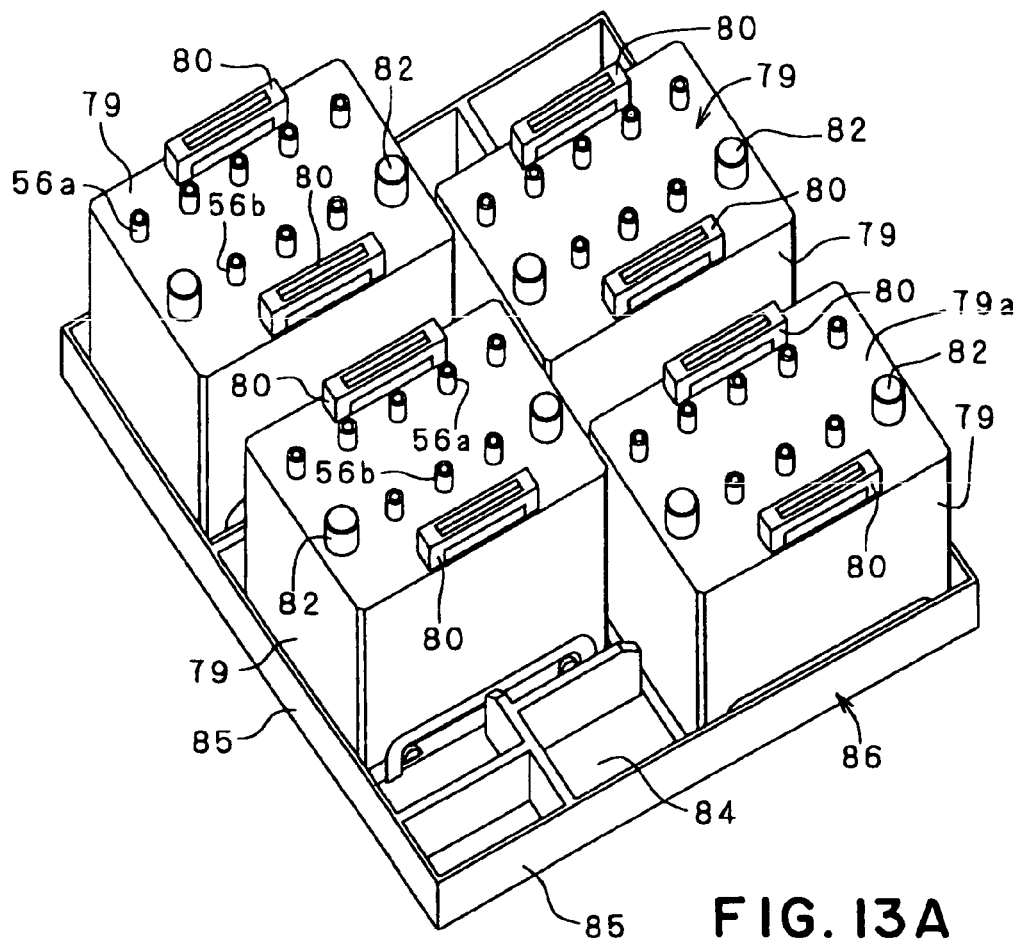
FIG. 13A is a perspective view of an integrated structure of a plurality of ink ejecting units.
Figure 13B:
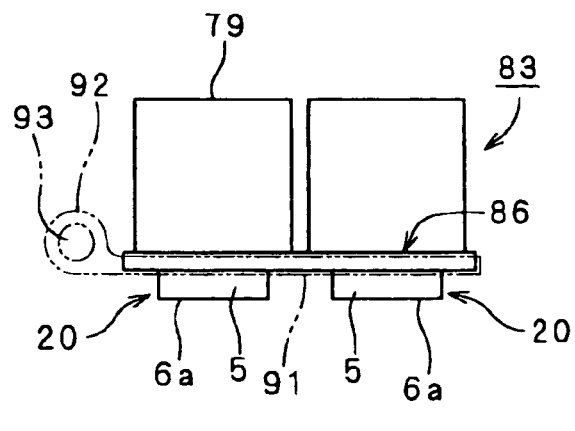
FIGS. 13B and 13C are side views of the integrated structure of a plurality of ink ejecting units.
Figure 13C:
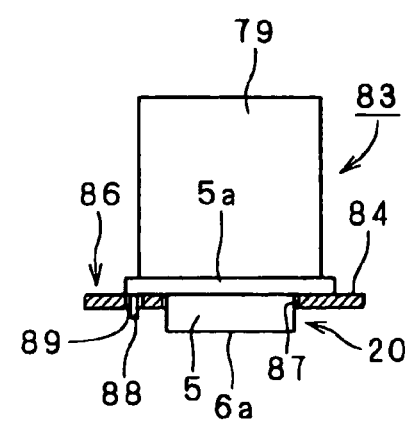

FIGS. 13A to 13C and 14 show a structure (assembly) wherein a plurality of ink ejecting units 83 having the above configuration is combined. A connecting member 86 is formed by providing wall plates 85 at edges of a substantially rectangular flat plate member 84. As shown in FIG. 13C, four attachment openings 87, each of which a main body of each head case 5 is fitted in, are formed in the connecting member 86. When a plurality of (four) ink ejecting units 83 are fitted in the attachment openings 87, a connecting surface formed by a lower surface of the flange 5a of each head case 5 is closely connected to an upper surface of the connecting member 86. Thus, the respective nozzle-formed surfaces 6a are aligned in the same plane, as shown in FIG. 13B.

In addition, as shown in FIGS. 10 and 12A, downward positioning pins 88 are provided at the flange 5a. Then, positioning holes 89 for receiving the pins 88 are provided in the connecting member 86. As shown in FIG. 13C, when the positioning pins 88 are fitted in the positioning holes 89, the respective nozzle-formed surfaces 6a are positioned in a predetermined relative positional relationship.

Figure 14:
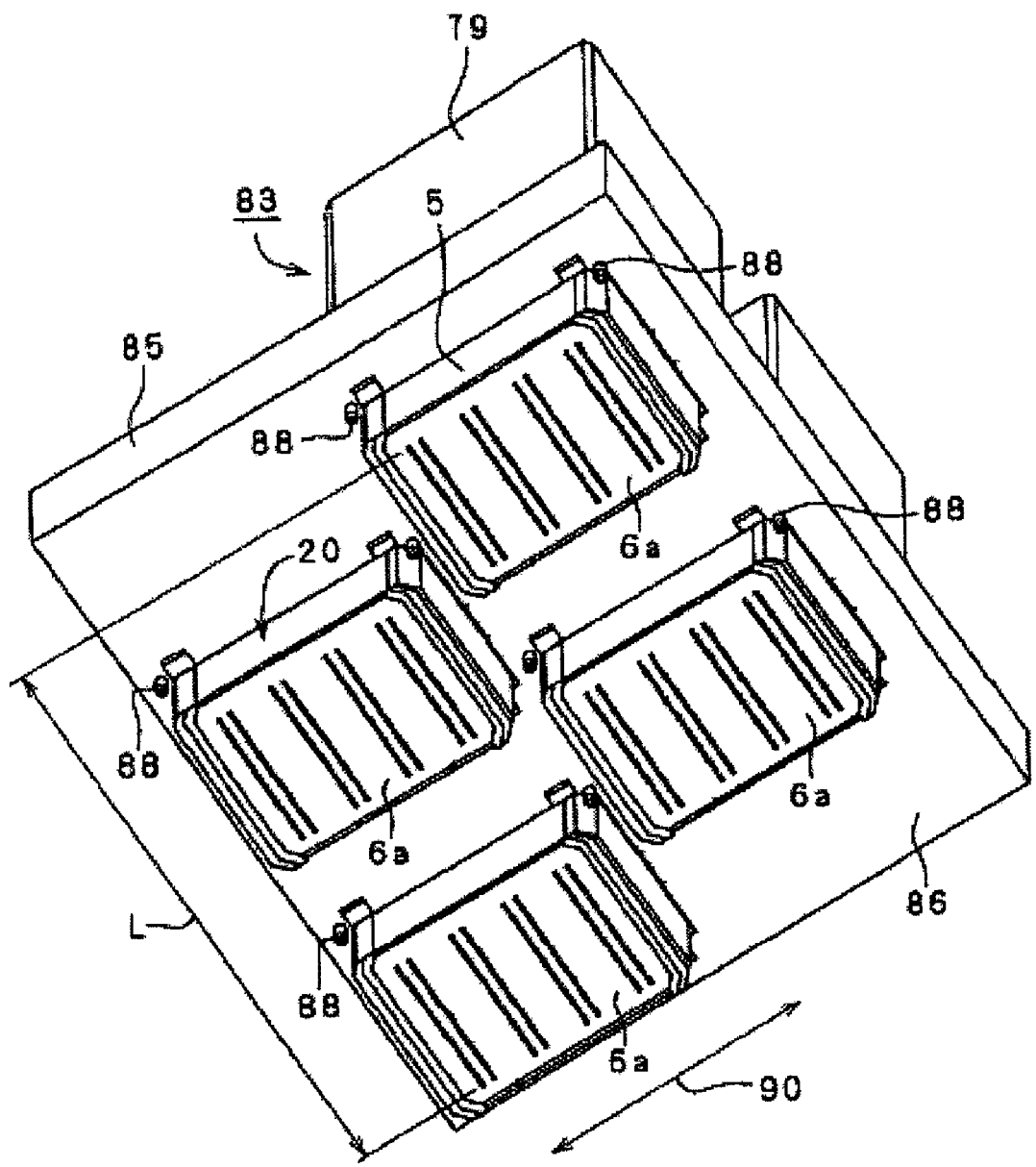
FIG. 14 is a perspective view of the integrated structure of a plurality of ink ejecting units.

That is, as shown in FIG. 14, nozzle rows 1a formed in each nozzle-formed surface 6a are aligned in a predetermined alignment state. Thus, when a printing operation is conducted in the main scanning direction shown by an arrow 90, the printing operation may be effective within a wider range L.

A structure as shown in FIG. 13B may be adopted for mounting the assembly including the plurality of ink ejecting units 83 as shown in FIGS. 13A and 14, to an apparatus main body. That is, a head part 92 is integrally formed at an end portion of an arm member 91 fixed to the connecting member 86, and a guide hole 93 is formed at the head part 92. The guide hole 93 is pierced through by the guide shaft 14 shown in FIG. 1A in a slidable manner. Thus, the assembly including the four ink ejecting units 83 and the connecting member 86 is mounted on the ink-jetting recording apparatus main body, as shown in FIG. 1A.

Next, an operation and the effect of the above embodiment are explained.

As described above, at least two or more kinds of ink are independently caused to flow into one pressure control valve unit 36. Thus, the number of pressure control valve units 36 may be reduced. Therefore, an integrated unit (the ink ejecting unit 83 in the above example) including the small number of (five in the above example) pressure control valve units 36 and the recording head 20 may be made compact. This can also achieve size reduction of the ink-jetting recording apparatus.

In addition, since the valve chambers 42a, 42b, in which the opening-closing valves 51a, 51b are provided, are formed at the opposite sides of the unit substrate 41, the structure including the valve chambers 42a, 42b can be formed (processed) from the both sides of the unit substrate 41. That is, the material of the unit substrate 41 may be effectively used to arrange the plurality of valve chambers 42a, 42b and opening-closing valves 51a, 51b. This can contribute to size reduction of the pressure control valve unit 36. In addition, since the valve chambers 42a, 42b are formed from the both sides of the unit substrate 41, the thickness of the process control valve unit 36 may be made thinner. Such size reduction of the pressure control valve unit 36 itself is very effective for making the integrated unit (ink ejecting unit 83) of the pressure control valve units 36 and the recording head 20 compact.

Figure 18:
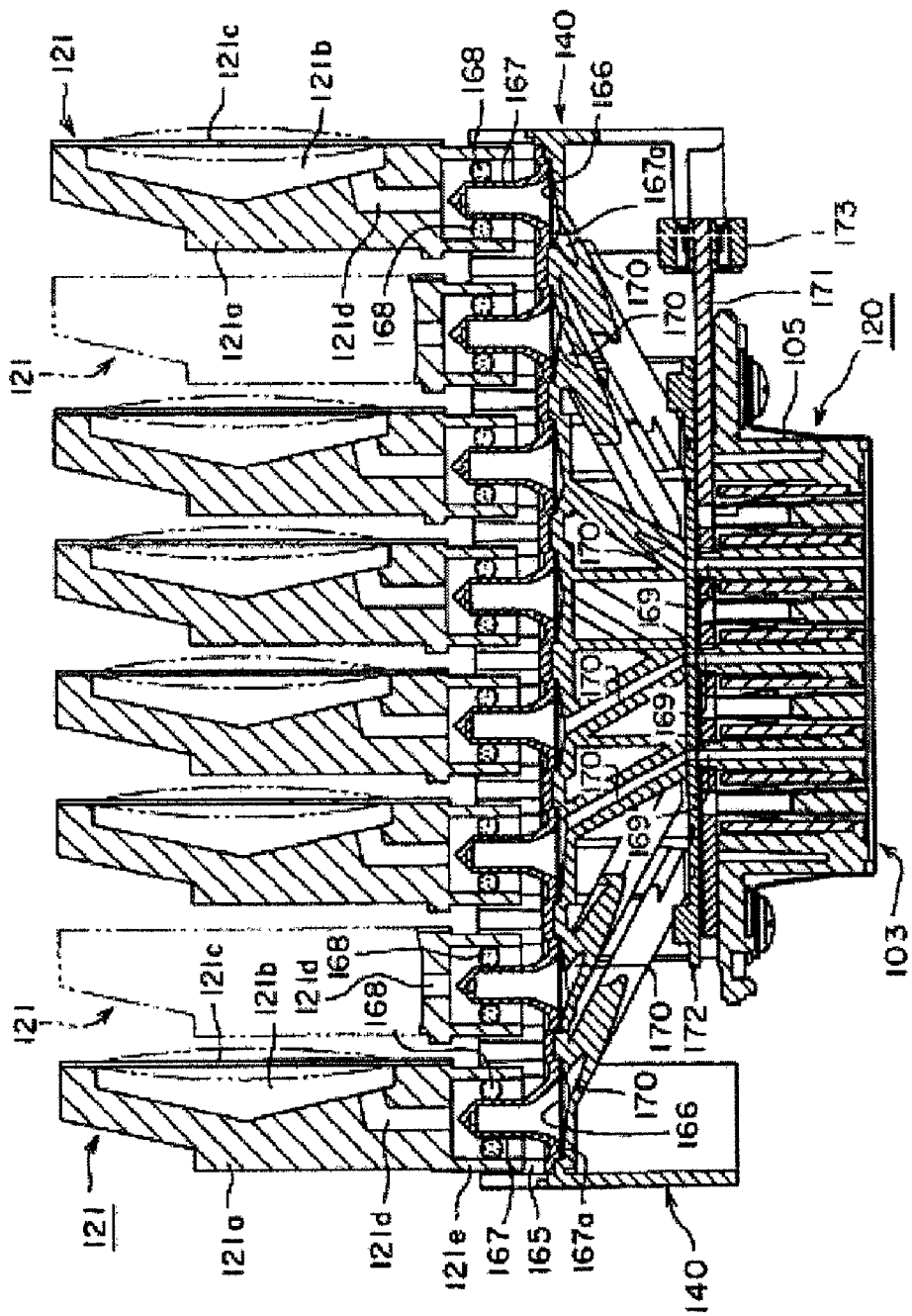
FIG. 18 is a sectional view showing an example of conventional structure wherein pressure damper units and a recording head are integrated.

In addition, when the thickness of the pressure control valve unit 36 is thin, the pressure control valve unit 36 can be joined directly to the recording head 20. Thus, the conventional connecting member (connecting member 40 in FIG. 18) becomes unnecessary. Thus, lengths of respective flow-paths from ink-flowing-out portions of the pressure control valve unit 36, i.e. the outlet ports 75a, 75b, to ink-flowing-in portions of the recording head 20, i.e. the ink-introducing ports 69, are shortened. In addition, even when there is a plurality of pressure control valve units 36, lengths of respective flow-paths may be set substantially even. Thus, ink flow-path resistance and the like of the respective flow-paths may be made substantially even, so that ink-ejecting pressures may be also made substantially even. Thus, stabilization of ejecting performance can be achieved.

Since the unit substrate 41 is formed in the flat and substantially parallelepiped rectangular shape and the valve chambers 42a, 42b are respectively provided at the both sides of the unit substrate 41, at least two or more kinds of ink can be caused to flow into the flat and thin pressure control valve unit 36. Thus, the space required for each pressure control valve unit 36 may be reduced, and the integrated unit (83) of the pressure control valve units 36 and the recording head 20 may be made compact.

As described above, the valve chamber 42a provided at the one side of the unit substrate 41 (that requires a space in a side surface direction of the unit substrate 41) and the valve chamber 42b provided at the other side (that requires a space in a side surface direction of the unit substrate 41, similarly) are arranged in a positional relationship wherein they are diagonally shifted. Thus, dimensions of the unit substrate 41 in vertical and transversal directions may be made small, so that the pressure control valve unit 36 may be made more compact.

In addition, since the downstream-side filters 64a, 64b whose pressure loss is high are arranged in the vicinity of a downstream end of the pressure control valve unit 36, lengths of flow-paths between the downstream-side filters 64a, 64b and ejecting parts of the recording head 20 may be made constant for the respective flow-paths. Thus, ejecting property may be made uniform among the respective flow-paths.

In addition, the opening-closing valve 51a, 51b provided in each valve chamber 42a, 42b can be opened and closed by a driving operation from the pressure-chamber 43a, 43b side that is opposite to the valve-chamber 42a, 42b side. The driving operation from the pressure-chamber 43a, 43b side can have a correct effect on the opening-closing valve 51a, 51b in order to suitably control an ink pressure in the pressure chamber 43a, 43b at a predetermined pressure. That is, an operation as the pressure control valve 77a, 77b can be surely conducted. In addition, since the valve chamber 42a, 42b and the pressure chamber 43a, 43b are arranged at opposite sides of the unit substrate 41, the pressure control valve 77a, 77b may be made more compact.

In addition, since a center of the circular valve chamber 42a, 42b and a center of the circular pressure chamber 43a, 43b are arranged in a concentric positional relationship, the valve chambers 42a, 42b and the pressure chambers 43a, 43b can be arranged in the unit substrate 41 cohesively. That is, the pairs of the valve chambers and the pressure chambers can be arranged easily and compactly. In addition, a driving force from the pressure-chamber 43a, 43b side can be easily transmitted to the opening-closing valve 51a, 51b of the valve chamber 42a, 42b.

The pair of the valve chamber 42a and the pressure chamber 43a or the pair of the valve chamber 42b and the pressure chamber 43b communicates with each other via the communication hole 44 provided at a central portion thereof, and the communication hole 44 is opened and closed by the valve body 47. That is, the communication hole 44, the valve body 47, the valve chamber 42a(42b), the pressure chamber 43a (43b), and the like are concentrically arranged. Thus, an operation for opening and closing the valve body 47 can be conducted more stably.

In addition, since the ink flowing-in tubes 56a, 56b are provided at the upper portion of the unit substrate 41 and the ink flowing-out tubes 74a, 74b are provided at the lower portion of the unit substrate 41, it is easy to connect the ink supplying tubes 35 from the ink cartridge 23 to the ink flowing-in tubes 56a, 56b, and to connect the ink-introducing ports 69 of the recording head 20 to the ink flowing-out tubes 74a, 74b. In particular, when the pressure control valve units 36 are arranged on the recording head 20 in the standing-up state, the provision of the flowing-in tubes 56a, 56b and the flowing-out tubes 74a, 74b at the upper and lower portions of the unit substrate 41 is very preferable for the connection to the ink supplying tubes 35 and to the ink-introducing ports 69 of the recording head 20. Thus is very effective in sizes reduction of the ink-jetting recording apparatus.

In addition, since the upstream-side filters 59a, 59b are provided, impurities in the ink are removed, so that the valve function of the opening-closing valve 51a, 51b may be maintained normal. In addition, it is prevented that impurities flow down to the recording head 20.

In addition, the valve chamber 42a, 42b and the upstream-side filter 59a, 59b are arranged at the same side of the unit substrate 41, and the pressure chamber 43a, 43b and the downstream-side filter 64a, 64b are arranged at the same side of the unit substrate 41 opposite to the valve chamber 42a, 42b. Thus, the flow-path structure is simplified, so that unprofitable flow-path arrangement is avoided. In addition, since the both sides of the unit substrate 41 are effectively used, the structure may be made much thinner.

In the above embodiment, as a piezoelectric vibrating member, the piezoelectric vibrating member of vertical vibration mode is explained. However, a piezoelectric vibrating member of deflection (bending) vibration mode may be used. In addition, although the head case 5 is provided with the flange 5a, any other structure without the flange 5a may be adopted.

Figure 15:
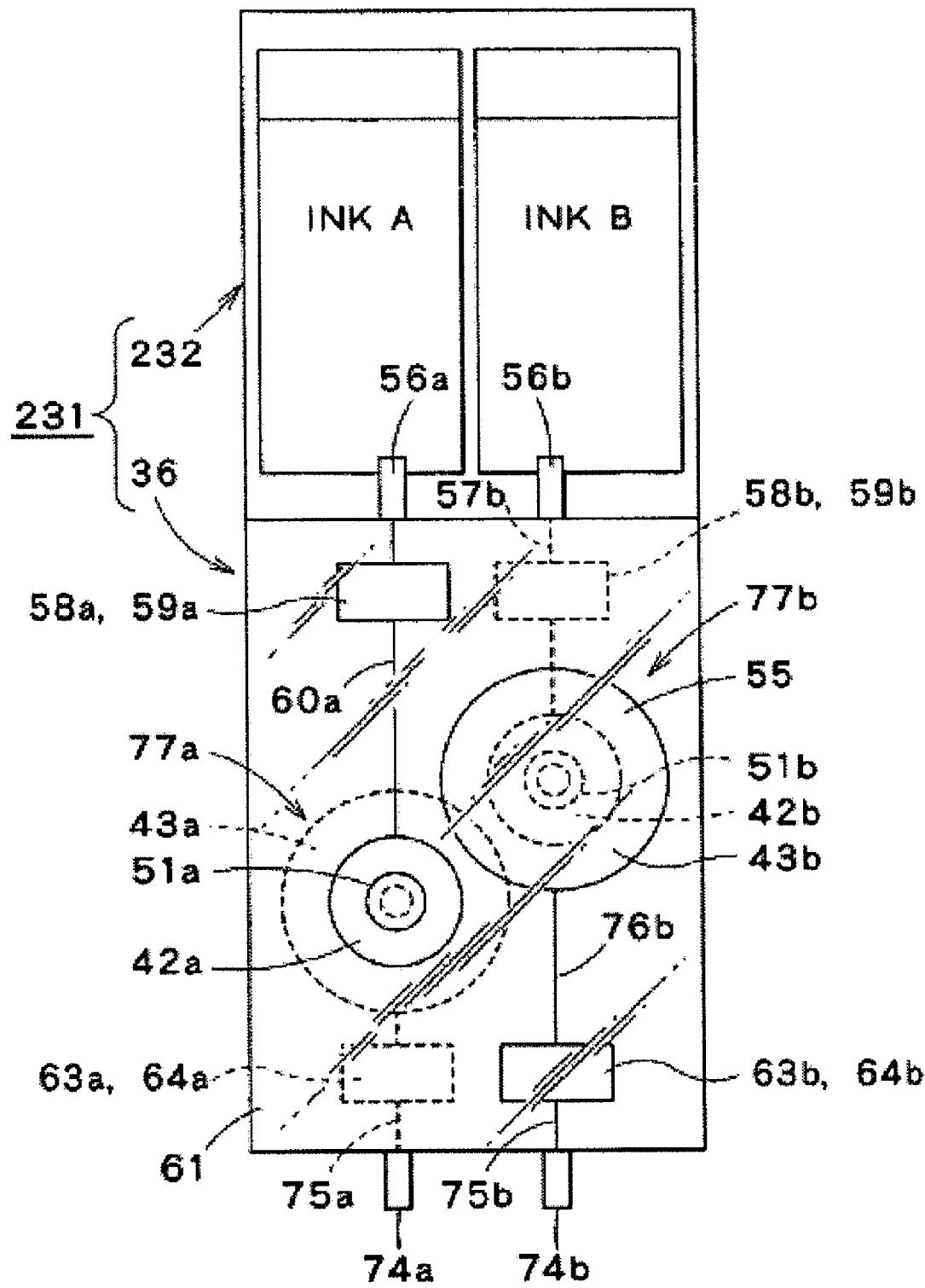
FIG. 15 is a schematic view of an ink cartridge of an embodiment according to the present invention.

The above pressure valve control unit 36 may be not only integrated to the recording head 20, but also integrated into an ink cartridge 231 having a ink containing part 232, as shown in FIG. 15. The ink cartridge 231 having the pressure control valve unit 36 as shown in FIG. 15 is also intended to be protected. Such an ink cartridge 231 is an ink cartridge formed for two color inks.

Figure 16:
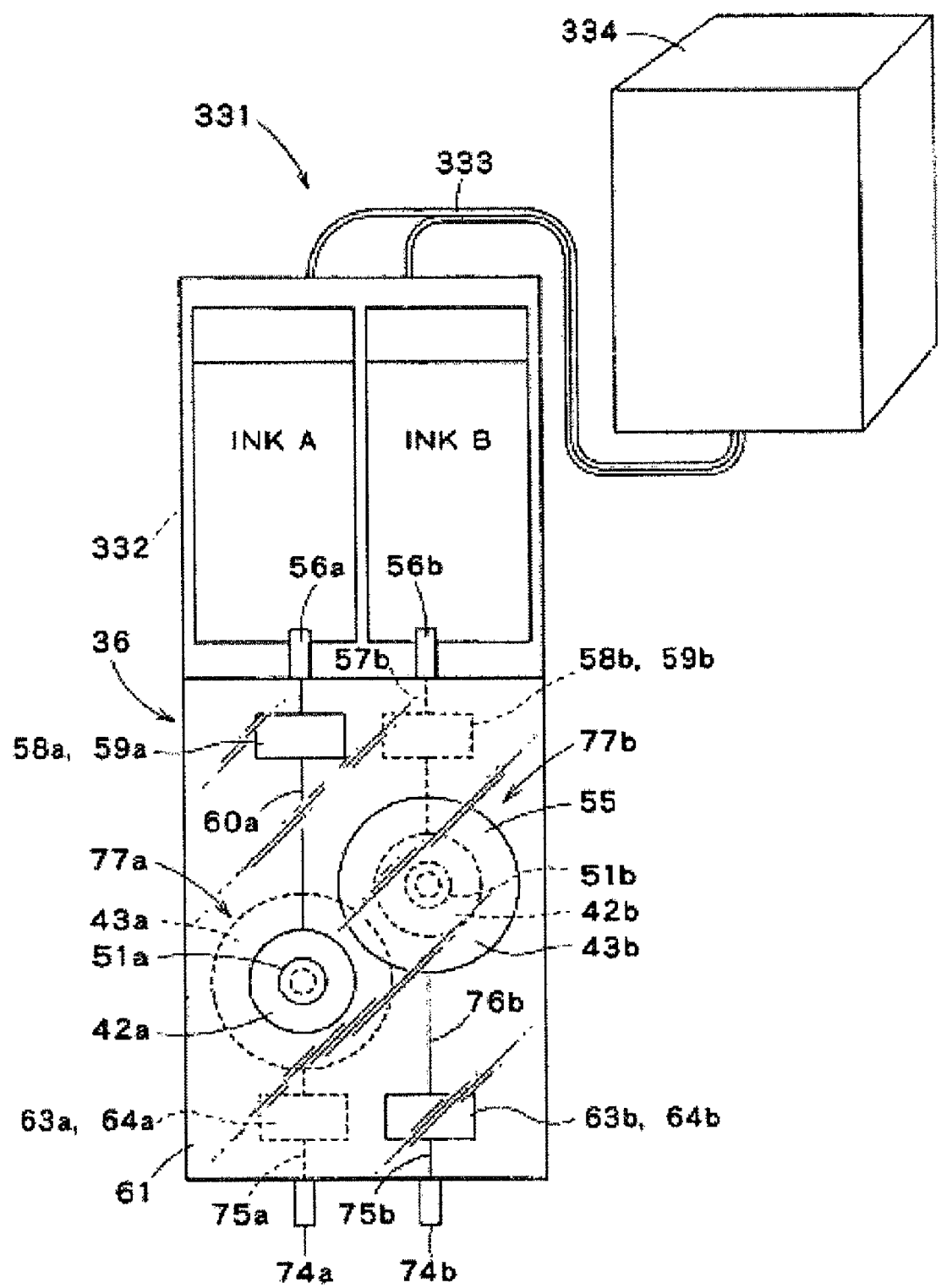
FIG. 16 is a schematic view of an ink cartridge with an external tank of an embodiment according to the present invention.
Figure 17A:
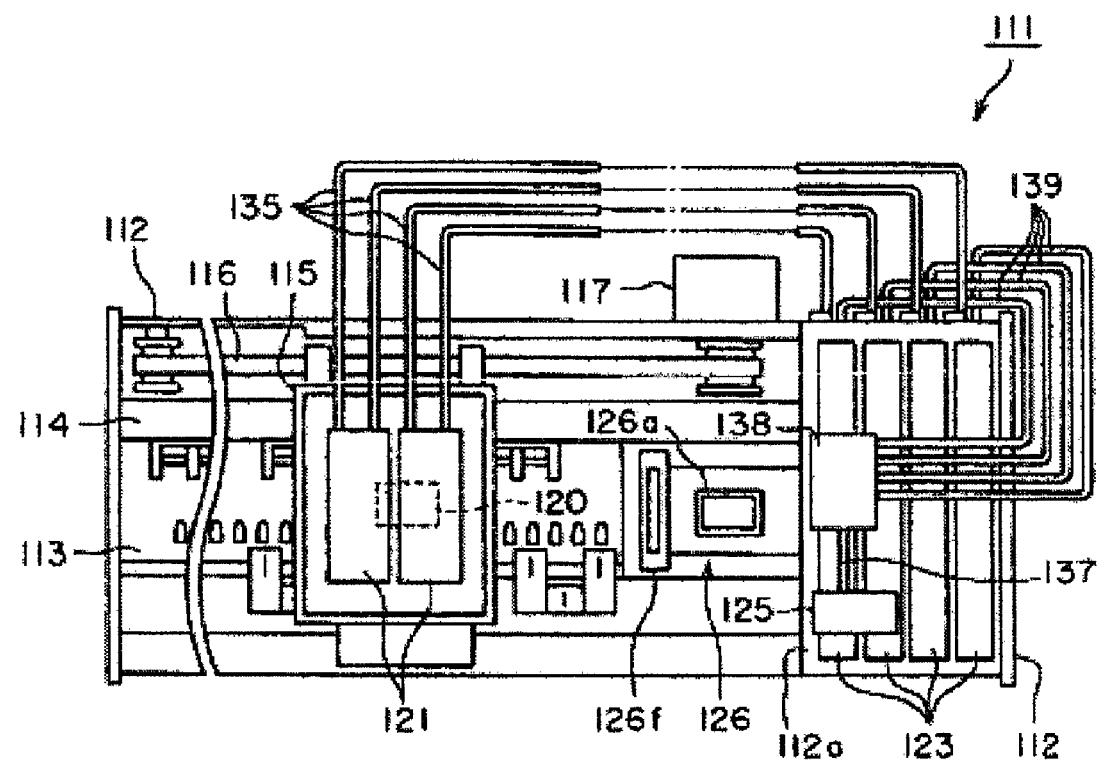
FIG. 17A is a plan view of a conventional ink-jetting recording apparatus.
Figure 17B:
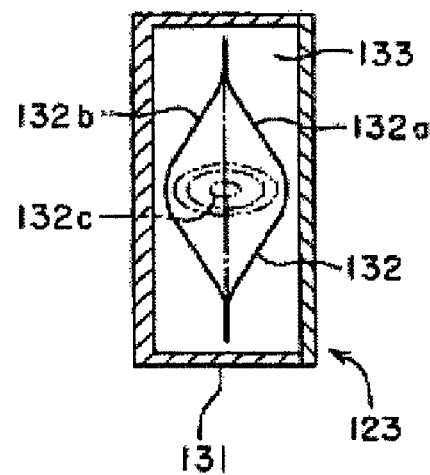
FIG. 17B is a sectional view of the ink cartridge of FIG. 17A.

In addition, the above pressure valve control unit 36 may be integrated into an ink cartridge 331 having: an ink containing part 332, connecting tubes 333 and an external tank 334. The ink cartridge 331 as shown in FIG. 16 is also intended to be protected. Such an ink cartridge 331 is also an ink cartridge formed for two color inks. In addition, an ink cartridge that includes no ink containing part 332 and whose pressure control valve unit 36 is directly connected to a connecting tube 333 is also intended to be protected.

The above description is given for an ink-jetting recording apparatus. However, this invention is intended to apply to general liquid ejecting apparatuses widely. Instead of the ink, the liquid may be glue, nail polish, electrically conductive liquid (liquid metal) for forming an electric circuit, or the like. In addition, this invention can be also applied to an apparatus for manufacturing color filters of a display member such as a liquid crystal display, an apparatus for ejecting electrode material used in forming an electrode of an organic EL display, an FED (face emission display) or the like, an apparatus for ejecting organic liquid used in manufacturing biochips, or the like.

The invention claimed is:

1. A pressure control valve unit comprising,
a unit substrate,
a first valve chamber provided at a first side of the unit substrate, forming a part of a first liquid flow-path,
a second valve chamber provided at a second side of the unit substrate opposing the first side, forming a part of a second liquid flow-path,
a first opening-closing valve provided in the first valve chamber, and
a second opening-closing valve provided in the second valve chamber,
wherein the first valve chamber and the second valve chamber are arranged in a positional relationship wherein they are not in axial alignment as seen in a thickness direction from the first side to the second side of the unit substrate,
the first liquid flow-path and the second liquid flow-path are formed independently of each other,
a liquid flow through the first valve chamber and a liquid flow through the second valve chamber are independent from each other, and
a pressure of a liquid flowing in the first liquid flow-path and a pressure of a liquid flowing in the second liquid flow-path can be controlled at respective predetermined pressures independently of each other.

2. A pressure control valve unit according to claim 1, wherein the first valve chamber is defined by a surface of the first side of the unit substrate and a sheet member, and the second valve chamber is defined by a surface of the second side of the unit substrate and a sheet member.

3. A pressure control valve unit according to claim 1, wherein the unit substrate is formed into a flat and substantially rectangular parallelepiped shape.

4. A pressure control valve unit according to claim 1, wherein the first valve chamber and the second valve chamber are arranged in a positional relationship wherein they are diagonally offset from each other as seen in a thickness direction from the first side to the second side of the unit substrate.

5. A pressure control valve unit according to claim 1, wherein a first downstream-side filter-containing chamber in which a first downstream-side filter is contained is provided in the first liquid flow-path on a downstream side of the first valve chamber, a second downstream-side filter-containing chamber in which a second downstream-side filter is contained is provided in the second liquid flow-path on a downstream side of the second valve chamber, and the first downstream-side filter and the second downstream-side filter are located in a vicinity of a lower end of the unit substrate.

6. A pressure control valve unit according to claim 1, further comprising a first pressure chamber provided at the second side of the unit substrate, forming a part of the first liquid flow-path on a downstream side with respect to the first valve chamber, and a second pressure chamber provided at the first side of the unit substrate, forming a part of the second liquid flow-path on a downstream side with respect to the second valve chamber, wherein the first pressure chamber communicates with the first valve chamber via the first opening-closing valve, and is adapted to control a pressure of liquid introduced from the first valve chamber via the first opening-closing valve at a predetermined pressure, and the second pressure chamber communicates with the second valve chamber via the second opening-closing valve, and is adapted to control a pressure of liquid introduced from the second valve chamber via the second opening-closing valve at a predetermined pressure.

7. A pressure control valve unit according to claim 6, wherein the first pressure chamber is defined by a surface of the second side of the unit substrate and a sheet member, and the second pressure chamber is defined by a surface of the first side of the unit substrate and a sheet member.

8. A pressure control valve unit according to claim 6, wherein a central portion of the first valve chamber and a central portion of the first pressure chamber are arranged in a positional relationship wherein they are overlapped as seen in a thickness direction from the first side to the second side of the unit substrate, and a central portion of the second valve chamber and a central portion of the second pressure chamber are arranged in a positional relationship wherein they are overlapped as seen in the thickness direction from the first side to the second side of the unit substrate.

9. A pressure control valve unit according to claim 8, wherein the central portion of the first valve chamber and the central portion of the first pressure chamber communicate via a first communication hole, a first valve body is inserted through the first communication hole, the first valve body is adapted to function as the first opening-closing valve, the central portion of the second valve chamber and the central portion of the second pressure chamber communicate via a second communication hole, a second valve body is inserted through the second communication hole, and the second valve body is adapted to function as the second opening-closing valve.

10. A pressure control valve unit according to claim 9, wherein the first valve body is supported by a leaf spring provided in the first valve chamber, and the second valve body is supported by a leaf spring provided in the second valve chamber.

11. A pressure control valve unit according to claim 6, wherein the first pressure chamber and the second pressure chamber are arranged in a positional relationship wherein they are partially overlapped as seen in a thickness direction from the first side to the second side of the unit substrate.

12. A pressure control valve unit according to claim 6, wherein a first upstream-side filter-containing chamber in which a first upstream-side filter is contained is provided in the first liquid flow-path on a upstream side of the first valve chamber, a second upstream-side filter-containing chamber in which a second upstream-side filter is contained is provided in the second liquid flow-path on a upstream side of the second valve chamber, and the first upstream-side filter and the second upstream-side filter are located in a vicinity of an upper end of the unit substrate.

13. A pressure control valve unit according to claim 1, wherein an inlet part of the first liquid flow-path and an inlet part of the second liquid flow-path are provided at an upper end of the unit substrate, and an outlet part of the first liquid flow-path and an outlet part of the second liquid flow-path are provided at a lower end of the unit substrate.

14. A pressure control valve unit according to claim 13, wherein each of a front surface, a back surface, a left side surface and a right side surface of the unit substrate is wholly flat.

15. A liquid ejecting apparatus comprising, a pressure control valve unit according to claim 1, a liquid supplying source that introduces liquid into the pressure control valve unit, and a liquid ejecting head that ejects the liquid controlled at a predetermined pressure by the pressure control valve unit.

16. A liquid cartridge comprising, a pressure control valve unit according to claim 1, and a liquid containing part that introduces liquid into the pressure control valve unit.

17. A liquid cartridge with an external tank comprising, a pressure control valve unit according to claim 1, and an external tank that introduces liquid into the pressure control valve unit.

18. A pressure control valve unit according to claim 1, wherein an outlet port of the first liquid flow-path and an outlet port of the second liquid flow-path are arranged in a direction substantially perpendicular to a thickness direction from the first side to the second side of the unit substrate, at a lower end portion of the unit substrate.

* * * * *